United States Patent
Dietz et al.

(10) Patent No.: US 11,779,010 B2
(45) Date of Patent: Oct. 10, 2023

(54) MULTI DIMENSIONAL DECOY BODY AND HEAD CONNECTOR

(71) Applicants: Benjamin Dietz, Elko New Market, MN (US); Paul Dietz, Elko New Market, MN (US)

(72) Inventors: Benjamin Dietz, Elko New Market, MN (US); Paul Dietz, Elko New Market, MN (US)

( * ) Notice: Subject to any disclaimer, the term of this patent is extended or adjusted under 35 U.S.C. 154(b) by 224 days.

(21) Appl. No.: 16/840,411

(22) Filed: Apr. 5, 2020

(65) Prior Publication Data

US 2021/0120807 A1 Apr. 29, 2021

Related U.S. Application Data

(63) Continuation of application No. 16/664,852, filed on Oct. 26, 2019.

(51) Int. Cl.
*A01M 31/06* (2006.01)
*F16B 1/00* (2006.01)

(52) U.S. Cl.
CPC .............. *A01M 31/06* (2013.01); *F16B 1/00* (2013.01); *F16B 2001/0035* (2013.01)

(58) Field of Classification Search
CPC ....................... A01M 31/06; F16B 2001/0035
See application file for complete search history.

(56) References Cited

U.S. PATENT DOCUMENTS

| | | | |
|---|---|---|---|
| 4,339,887 A | 7/1982 | Streeter | |
| 4,885,861 A | 12/1989 | Gazalski | |
| 4,893,428 A | 1/1990 | Gagnon | |
| 4,965,953 A * | 10/1990 | McKinney | A01M 31/06 43/2 |
| 5,136,800 A * | 8/1992 | Lanius | A01M 31/06 43/2 |
| 5,392,554 A | 2/1995 | Farstad et al. | |
| 5,570,531 A | 11/1996 | Sroka | |
| 5,964,055 A | 10/1999 | Smith | |
| 6,092,322 A | 7/2000 | Samaras | |
| 6,560,912 B1 | 5/2003 | Achepohl | |
| 6,647,657 B2 | 11/2003 | Igo | |
| 7,493,723 B2 | 2/2009 | Hess | |
| 7,568,305 B2 | 8/2009 | Fanfelle | |
| 7,716,866 B2 | 5/2010 | Zink et al. | |
| 8,082,690 B2 | 12/2011 | Zink | |
| 8,959,826 B2 | 2/2015 | Dean et al. | |
| 9,084,716 B1 | 7/2015 | Bawden | |
| 9,101,129 B2 | 8/2015 | Brooks | |
| 9,221,397 B1 * | 12/2015 | Kim | B60R 1/076 |
| 9,265,245 B2 | 2/2016 | Marsh | |
| 9,386,765 B1 | 7/2016 | Chatelain et al. | |
| 9,482,252 B2 | 11/2016 | Olien | |
| 2004/0211106 A1 | 10/2004 | Solomon | |

(Continued)

*Primary Examiner* — Michael H Wang

(74) *Attorney, Agent, or Firm* — Dietz Law Office LLC

(57) ABSTRACT

An apparatus and method for providing three-dimensional decoy having removeable or interchangeable body parts. The decoy includes an interchangeable head or support pole having a connecting system that quickly interlocks the head or pole to the decoy body. Further, the connecting system engages the head or support pole to the body with enough resistance that the decoy stays together in heavy winds and may be lifted by holding the head without disengaging from the body.

19 Claims, 39 Drawing Sheets

(56) References Cited

U.S. PATENT DOCUMENTS

| | | | |
|---|---|---|---|
| 2005/0252066 A1* | 11/2005 | Couvillion, III | A01M 31/06 43/3 |
| 2007/0099469 A1* | 5/2007 | Sorensen | A45F 5/02 439/289 |
| 2007/0180754 A1 | 8/2007 | Neeley et al. | |
| 2007/0266613 A1 | 11/2007 | Nelson | |
| 2008/0163538 A1* | 7/2008 | Butz | A01M 31/06 43/3 |
| 2009/0007479 A1* | 1/2009 | Jerome, Sr. | A01M 31/06 248/156 |
| 2013/0078855 A1* | 3/2013 | Hornick | H01F 7/0205 439/571 |
| 2014/0237885 A1* | 8/2014 | Brooks | A01M 31/06 43/2 |
| 2014/0338249 A1 | 11/2014 | Heiges | |
| 2015/0040460 A1 | 2/2015 | Jones et al. | |
| 2015/0173347 A1 | 6/2015 | Lawton | |
| 2015/0208640 A1* | 7/2015 | Marsh | A01M 31/06 43/3 |
| 2016/0324142 A1 | 11/2016 | Stirling | |
| 2018/0213770 A1* | 8/2018 | Davis | A01M 31/06 |

\* cited by examiner

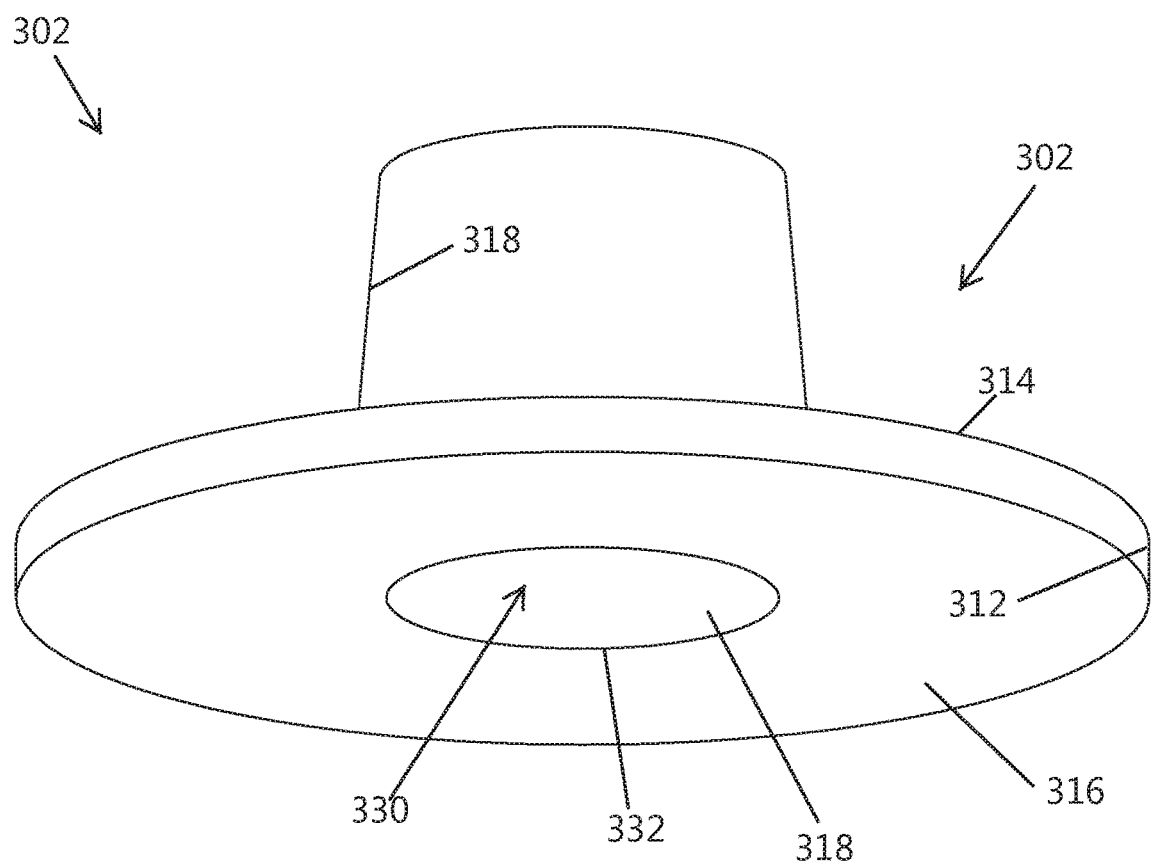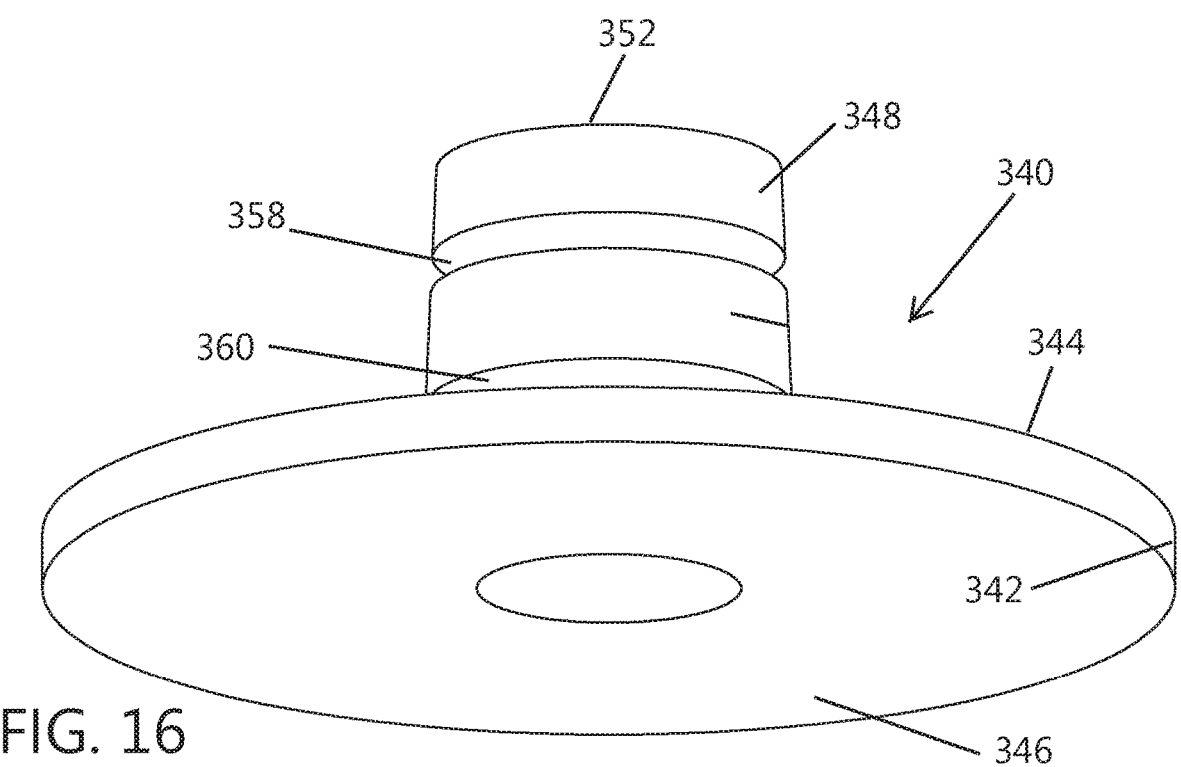
FIG. 16

MULTI DIMENSIONAL DECOY BODY AND HEAD CONNECTOR

CROSS-REFERENCE TO RELATED APPLICATIONS

This application claims the filing benefit and priority of U.S. Non-Provisional application Ser. No. 16/664,852 filed Oct. 26, 2019, the contents of which are incorporated herein by reference in its entirety.

FEDERAL SPONSORSHIP

Not Applicable

JOINT RESEARCH AGREEMENT

Not Applicable

TECHNICAL FIELD

This invention relates generally to wildlife decoys used to attract wildlife. More particularly, the invention pertains to three-dimensional decoys having removeable or interchangeable parts. The present invention includes an interchangeable head, legs, or stake having a connecting system that quickly interlocks the head or stake to the decoy body without the need for semi-permanent assembly, rotation or snap fit. Further, the interlock of the invention engages the head or stake to the body with enough resistance that the decoy may be lifted by holding the head without the body disengaging and falling off (and stays engaged during heavy winds), yet the interlock quickly releases when desired. Further, the decoy body may be in the form of a sock and the body connector may include an extension member or backbone to hold the sock in a horizontal orientation.

BACKGROUND

Over the years different animal attractants and decoy systems have been devised in an attempt to create the appearance of a desirable surroundings. Oftentimes, many decoys are used to create the appearance that a large flock or herd is utilizing the surroundings. Generally, silhouettes, socks, full body, shells, inflatables, spinners, and other mechanical decoys have been devised to attract animals into the hunter's surroundings. The decoy styles have evolved from rudimentary solid blocks to intricate lifelike 3D sculptures. Some of these decoys include removeable body parts, however the fastening mechanisms for the removeable body parts have required additional time to set up and place the decoys in the water or fields. Further, the typical muddy or icy environment has limited the obvious prior fastening mechanisms. Also, frequently, the decoys are placed in the field or water in low light conditions and during extreme inclement weather. Heads having a variety of positions and moving parts have been incorporated into decoys to increase the realism of the decoy spread. However, additional set up time is required when handling these decoys. Especially during severe weather conditions with snow and ice present, decoys that require minimal time to set up and place in a desired location would be preferred.

Additionally, although flocking and intricate detailing on decoys increase the realism of each decoy, special care and handling are required to avoid scratching or scuffing the surface of these decoys. When picking up and handling decoys it is natural to use the decoy head as a handle to carry the decoy. Many decoys have removable heads to reduce the amount the heads are handled and to reduce space requirements when storing the decoys. Prior decoy systems have been described that attempt to create a removeable head that may be installed and removed. However, typical head attachments essentially require a twisting and screwing the head onto the body, a localized and directed force to snap the head into engagement with the body, or a pushing and twisting of the head against the body to secure the head to the body. These prior fastening mechanisms were required to allow the user to pick up and carry the decoy without the body falling off the decoy. Also, prior sock or bag style decoys typically require a semi-permanent attachment of the stake to the bag making it extremely impractical to remove the stake from the bag when removing a decoy spread from the field.

Further, the prior attachment mechanisms are all difficult to execute while wearing heavy gloves or mittens and tend to scuff the flocking and paint from the heads. Also, during freezing temperatures, the heads and attachment mechanisms have a tendency to crack or break when subject to forces or torques. No known prior device describes an interlock between the head and body of a decoy capable of supporting the weight of the decoy body when lifting with the head and that disengages without requiring unsnapping or twisting forces. Additionally, no known prior device describes an interlock suitable for retrofitting to existing decoy heads and bodies.

Also, sock or silhouette style decoys utilize a stake (wires, poles, or other support) that is forced into the ground. Oftentimes, when removing the stake, the stake has a considerable amount of mud sticking to the stakes. When packing up the gear these prior sock style decoys have been stacked together with the muddy stakes comingled with the white socks or bags. Further, no known sock or silhouette decoy includes a stake that detaches from the sock without disassembling a portion of the stake and sock link. The stakes of the present invention may be quickly removed from the sock and stored in a separate storage compartment to keep the white socks clean during transport and storage.

SUMMARY

Embodiments according to aspects of the invention includes an interlock that is adaptable for attaching a decoy head to a decoy body or attaching a stake or pole to a sock or silhouette. The decoy head and body may be made from a durable polymer, rubber or other material using known manufacturing techniques including roto molding, plastic injection molding, blow molding or other methods to form the decoy head and body in the preferred shape having the interconnect of the invention either separate or integral with the head and body. Alternatively, the decoy body may be formed from a durable plastic composite bag or sock and the head may be in the form of a stake or a head with a stake extending from the head. Further, the interconnect or interlock may be manufactured using these or similar known molding techniques and may be incorporated or retrofitted into an existing floating, field, silhouette, or sock decoy.

The interlock of the present invention simply connects the head or stake firmly to the body or bag of a decoy without requiring force, twisting, semi-permanent assembly, or other complex mechanical fasteners that tend to fail during inclement weather. The interlock of the invention may be incorporated into existing decoy head and bodies to eliminate the complex fastener or may be utilized to create a decoy having a simple interconnect between the body and removeable extremity portions.

In an embodiment of the invention, the decoy includes a body and a removeable extremity that has a base. The body has a receptacle having an open end, inward tapered side walls extending into the body from the open end, and the sidewall terminates at a bottom portion within the body. The sidewall has a width or first diameter adjacent the open end that is greater than a second width or diameter adjacent the bottom portion. The bottom portion includes a first magnet contained by the bottom portion. The base portion of the removable extremity interconnects with the body. The base portion includes an outwardly extending tapered projection terminating in an end. The tapered projection is sized to fit within the receptacle of the body and the end includes a second magnet contained by the end. The first and second magnets are oriented with reverse poles so that the magnets are drawn towards each other. The magnetic force and tapered sidewalls hold the body and extremity together without the need for mechanical interlocks. Those skilled in the art will appreciate that a metal may be used as a substitute for one of the magnets. However, use of a magnet in both the body and extremity is preferred.

Alternatively, according to aspects of the invention, the first magnet may be embedded or fully enclosed within the bottom portion of the receptacle. The second magnet may likewise be enclosed within the end of the base portion of the projection. The embedded magnets remain operable in cold, heat, swamp water, dirt, grime and other extreme environments. A hollow enclosed cavity to receive the magnet may be formed within the bottom portion of the receptacle, and the cavity may be isolated from ambient air. Further, a cavity to receive another magnet may be formed in the end of the base portion, wherein the cavity is isolated from ambient air. Those skilled in the art will appreciate that other structures may be utilized to embed magnets into the receptacle and base without departing from the scope of the invention.

In an embodiment of the invention, the decoy includes a body having a receptacle and a head having a base, wherein the base interlocks with the receptacle. The receptacle has an open end, inward tapered side walls extending into the body from the open end, and terminates at an enclosed bottom portion within the body. The sidewall has a first width or diameter adjacent to the open end that is greater than a second width or diameter adjacent to the enclosed bottom portion. Also, the enclosed bottom portion includes a first magnet embedded in the enclosed bottom portion. The base portion interconnects with the body. The base portion includes an outwardly extending tapered projection terminating in an enclosed end. The tapered projection is sized to fit within the receptacle of the body. Also, the enclosed end includes a second magnet embedded in the enclosed end. The first and second magnets are oriented such that they provide an attracting and retaining force between the receptacle and protrusion.

Alternatively, without departing from the scope of the invention, the enclosed bottom may include a hollow enclosed cavity formed within the bottom portion of the receptacle. The magnet is embedded within the hollow enclosed cavity. Further, a cavity may be formed in the enclosed end of the projection, wherein the cavity is isolated from ambient air. The second magnet may be embedded in the cavity formed in the enclosed end of the projection.

Also described herein is an apparatus to interconnect a body and removable extremity portions of a decoy. The apparatus includes a first connector having a receptacle that may be attached to either the head or body of a decoy. The apparatus further includes a second connector having a base portion that mates with the first connector and may similarly be incorporated into the body or head of the decoy. The receptacle of the first connector includes an open end, inward tapered side walls extending into the first connector from the open end, and a terminating bottom portion within the first connector. The sidewall has a first width or diameter adjacent to the open end that is greater than a second width or diameter adjacent to the bottom portion. Further, the bottom portion includes a first magnet contained by the bottom portion. The second connector has a base portion that interconnects with the first connector. The base portion includes an outwardly extending tapered projection terminating in an end. The tapered projection is sized to fit within the receptacle of the first connector. Also, the end of the projection includes a second magnet contained by the end.

Additionally, the first magnet may be enclosed or embedded within the bottom portion of the receptacle, and the second magnet may be enclosed or embedded within the end of the projection of the base portion. A hollow enclosed cavity may be formed within the bottom portion of the receptacle in which the magnet is contained. Likewise, a cavity may be formed in the end of the base portion, wherein the second magnet may be contained within the cavity. The cavities may be isolated from ambient air to further reduce the effects of extreme conditions to which decoys are subjected.

In another alternate embodiment of the invention a first connector is coupled to a decoy sock or bag and a second connector is attached to a stake or pole of the wind sock style decoy. The connectors include mating tapered projections and receptacles that may mate in a manner to ensure that the decoy body is deployed upright. Further, the mating projections or receptacles include magnets to secure the projections to the receptacles with enough attraction that they remain drawn together in heavy winds that inflates the bag or sock.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

FIG. 16 is a bottom perspective view of an interconnect in accordance with an embodiment of the invention;

DETAILED DESCRIPTION

The following description provides detail of various embodiments of the invention, one or more examples of which are set forth below. Each of these embodiments are provided by way of explanation of the invention and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment may be used in another embodiment to yield a still further embodiment. Thus, it is intended that the present invention also cover such modifications and variations that come within the scope of the appended claims and their equivalents.

The apparatus for interconnecting the body portion and extremity portion of a decoy of the present invention generally includes an interconnecting base and an interconnecting receptacle. The interlock of the present invention is particularly well suited for interconnecting the head or feet of a waterfowl decoy to the body of the decoy. The interconnects are suitable for both field and water decoys that provide a sturdy connection, but that are also efficient to remove. Similarly, the interlock or interconnect of the present invention is particularly well suited for interconnecting a wind sock decoy body to a wind sock stake or pole.

The base or protrusion and receptacle of the interconnect cooperate together to create interlocks that are drawn together with sufficient force to allow a user to carry the decoy by the head without having the head fall off the body. Further, the head or stake is drawn to the body with sufficient force to remain intact during extreme wind conditions. Those skilled in the art will appreciate that decoys may be manufactured utilizing, integrating or incorporating the interconnect of the present invention. However, the interconnect of the present invention may also be used advantageously to retrofit existing decoys with a simple to use and efficient system. The interlock may further include rims extending from the protrusion and receptacle that may be contoured to match the contour of existing decoy bodies or extremities.

Figure 1:
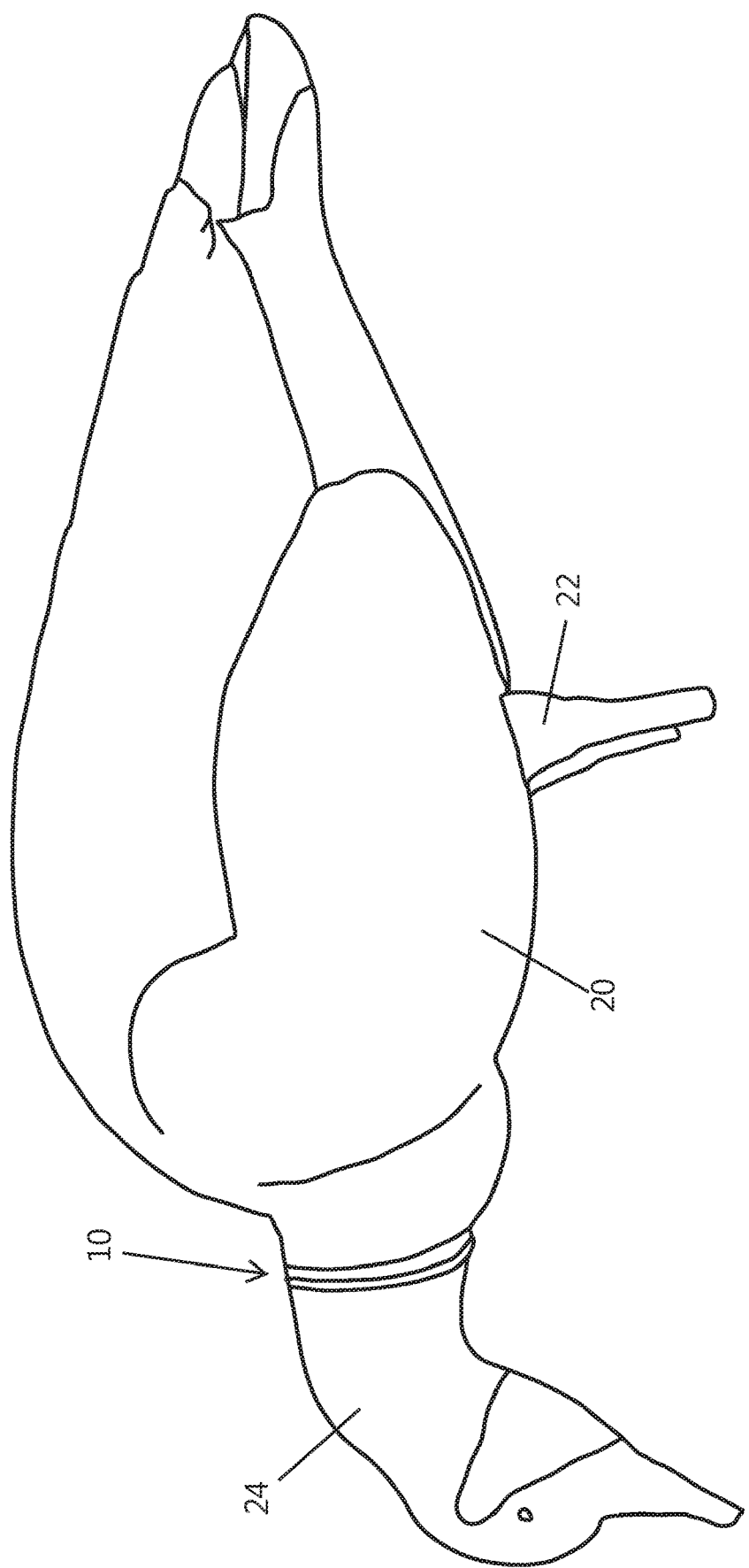
FIG. 1 is a perspective view of an interlock in accordance with an embodiment of the invention connecting the head and body of a field goose decoy.
Figure 2:
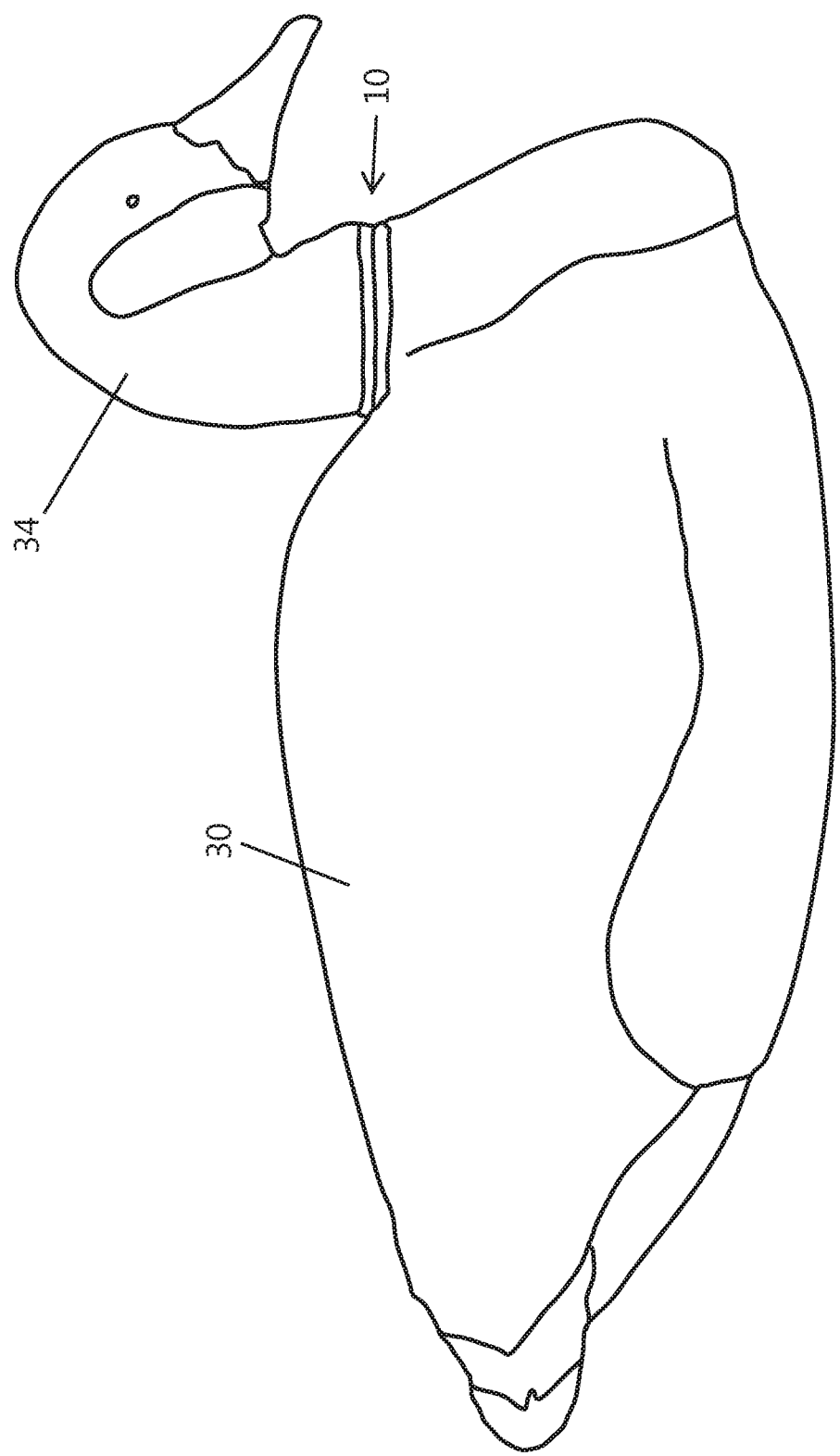
FIG. 2 is a perspective view of an interlock in accordance with an embodiment of the invention connecting the head and body of a floating water goose decoy.
Figure 3:
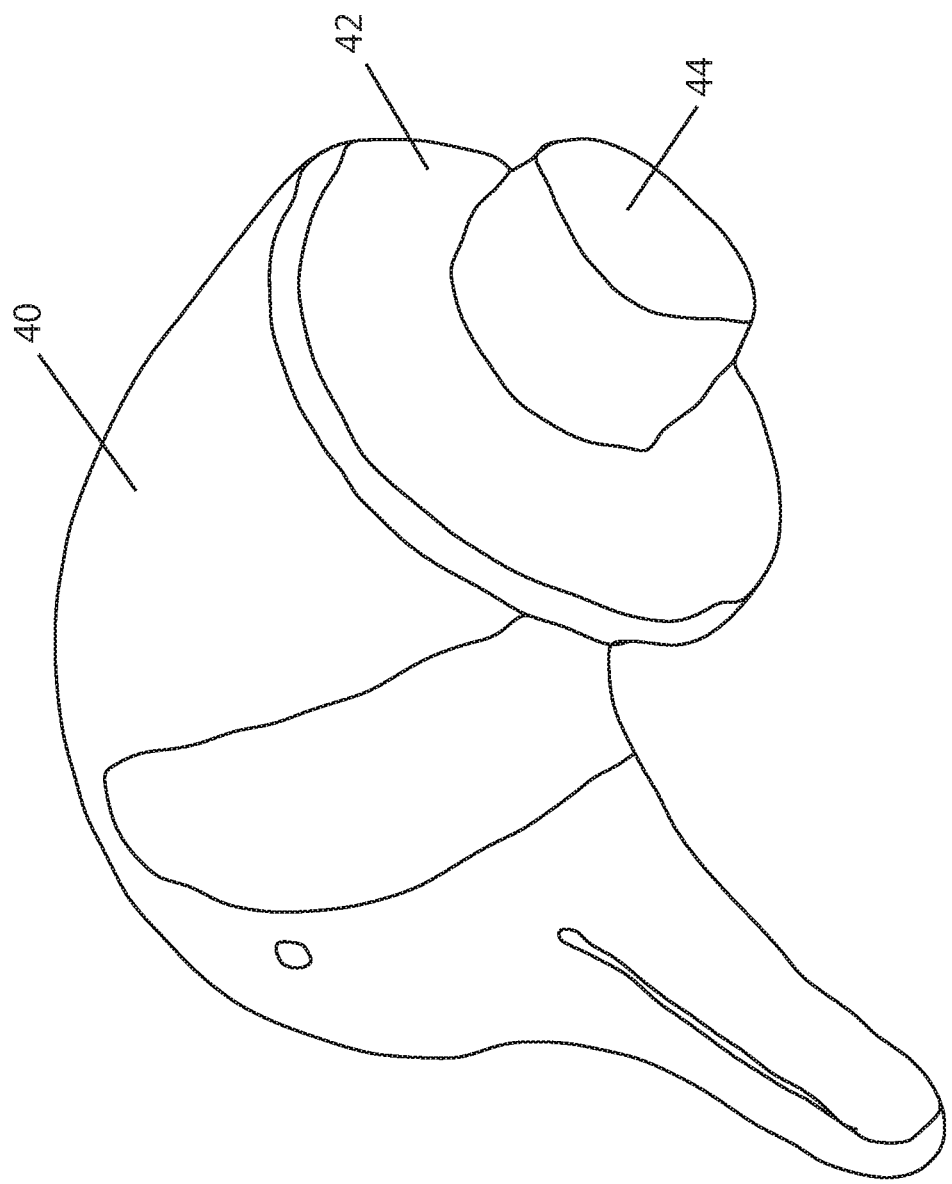
FIG. 3 is a perspective view of a goose decoy head having one half of an interconnect in accordance with an embodiment of the invention.

Turning attention now to the Figures, embodiments of the apparatus 10 for interconnecting the body and extremity of a decoy in accordance with the present invention will now be described in more detail. Decoys having an interconnect 10 of the present invention that interconnect the head and body of a waterfowl decoy are generally shown in FIGS. 1-4. Those familiar with the art will appreciate that the head and body styles vary significantly between decoys that float on the water (floaters) and decoys that are spread out on land (field decoys). By way of example, floater decoys often have the head aligned further back on the body to simulate a resting or sleeping waterfowl. In contrast, the field decoy will often have the head stretched out or extending downward to simulate natural behavior of waterfowl in a field. FIG. 1 illustrates a field decoy body 20 having an interconnect or interlock 10 that interlocks the body 20 with interconnecting legs or feet 22 and an interconnecting head 24. Similarly, FIG. 2 shows a floater decoy having a body portion 30 interconnected with interlock 10 to the head 34.

Figure 4:
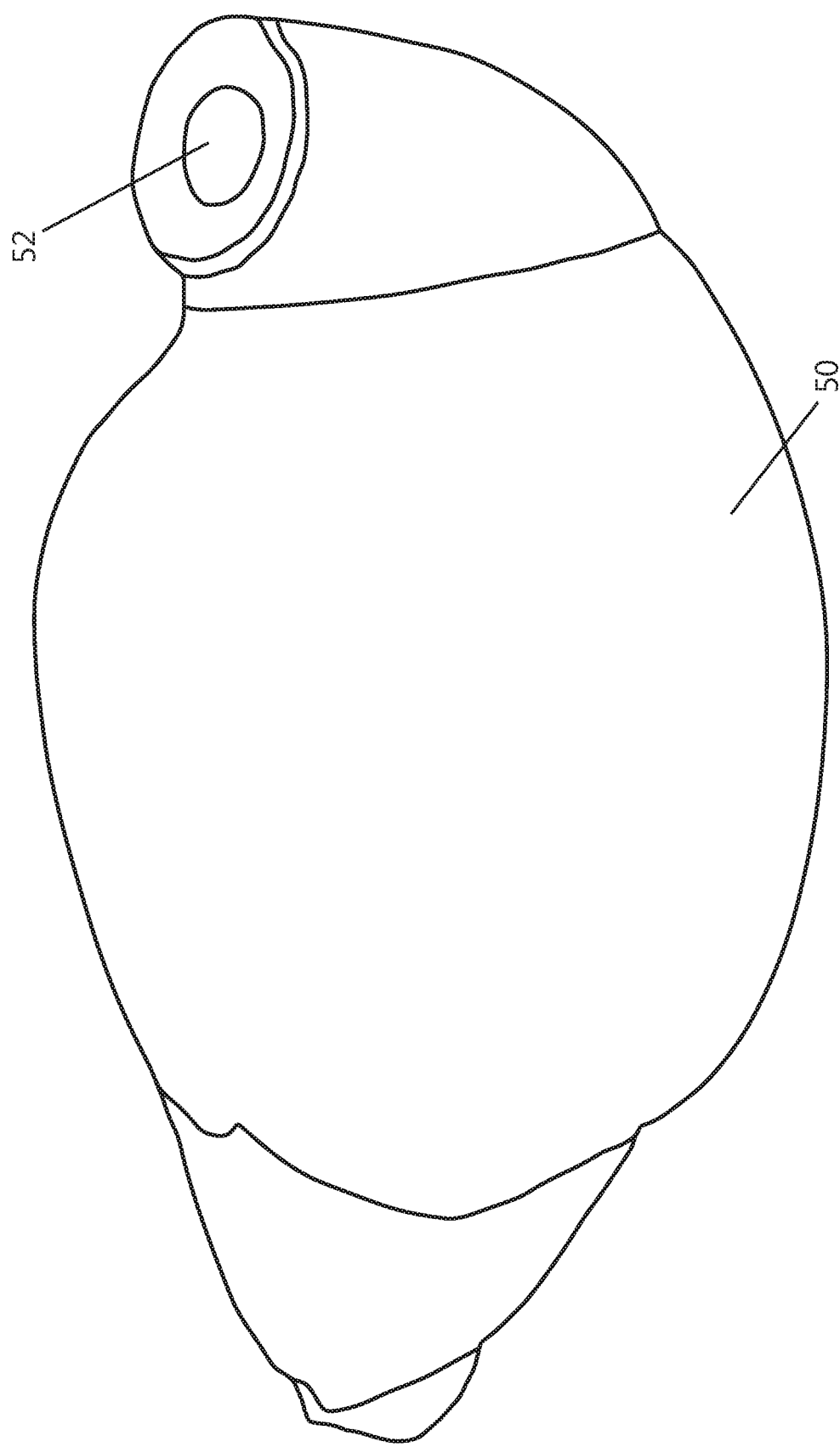
FIG. 4 is a perspective view of a goose decoy body having one half of an interconnect in accordance with an embodiment of the invention.
Figure 5:
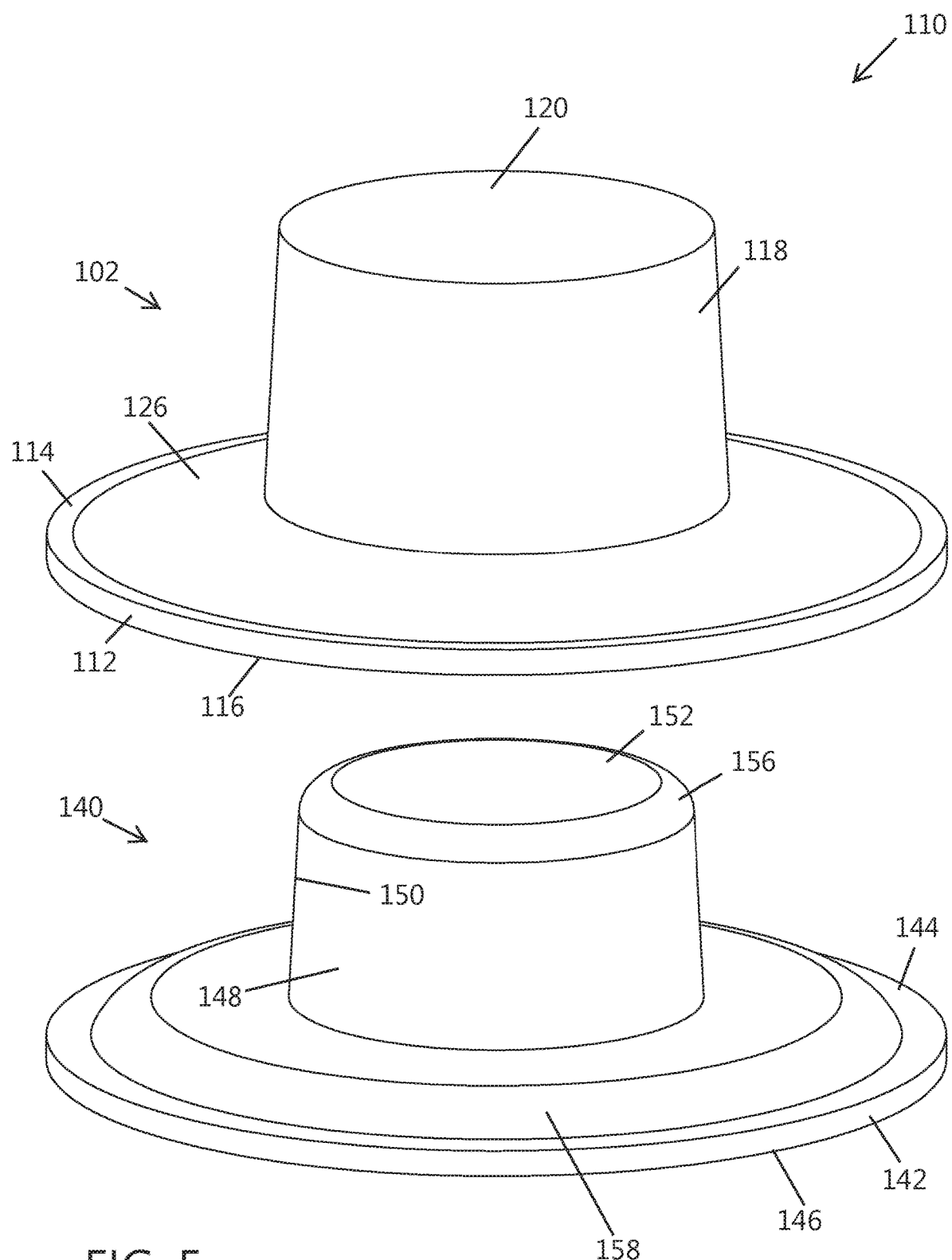
FIG. 5 is a top perspective view of an interconnect in accordance with an embodiment of the invention.
Figure 6:
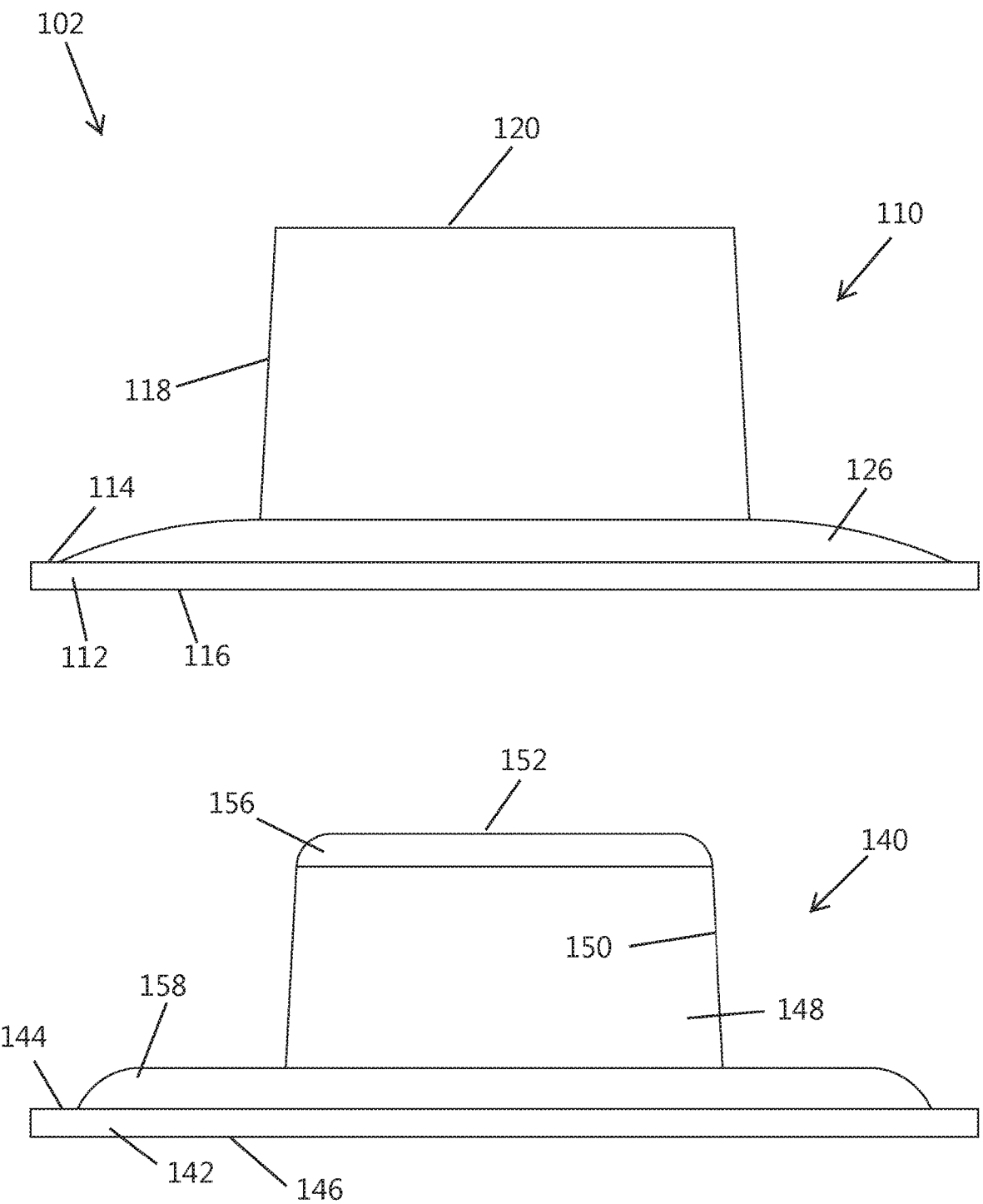
FIG. 6 is a side view of the interconnect of the type shown in FIG. 5.
Figure 7:
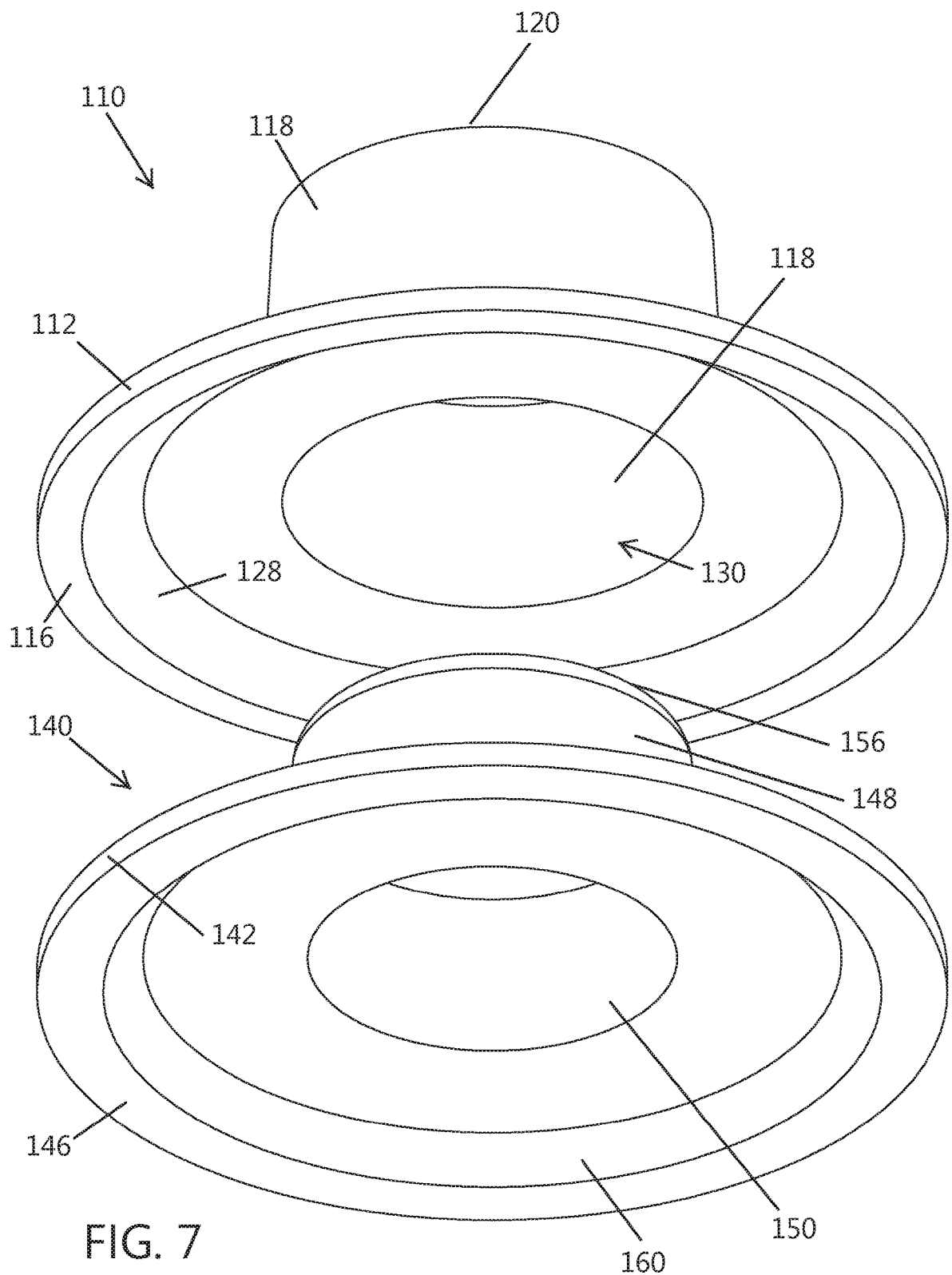
FIG. 7 is a bottom perspective view of an interconnect of the type shown in FIG. 5.
Figure 8:
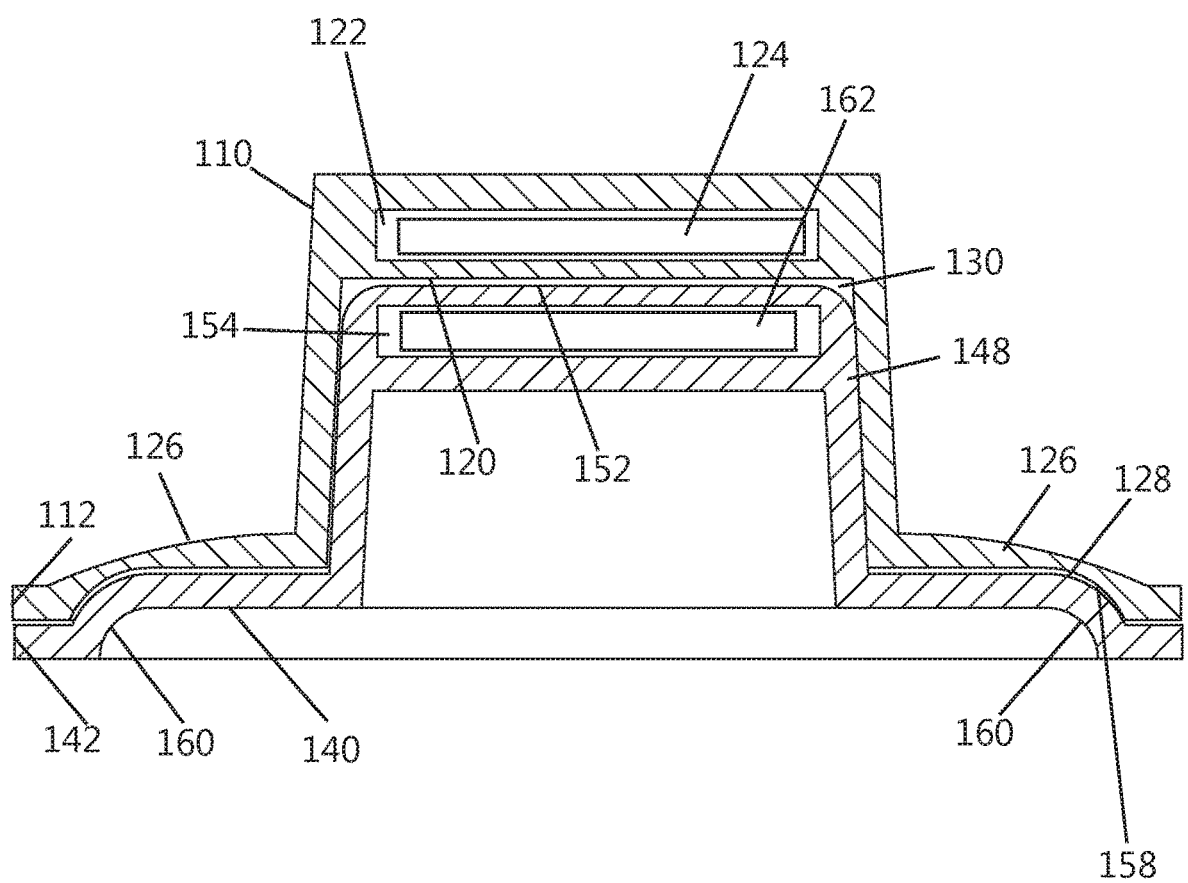
FIG. 8 is a partial sectional perspective view of an interconnect in accordance with an embodiment of the invention.
Figure 9:
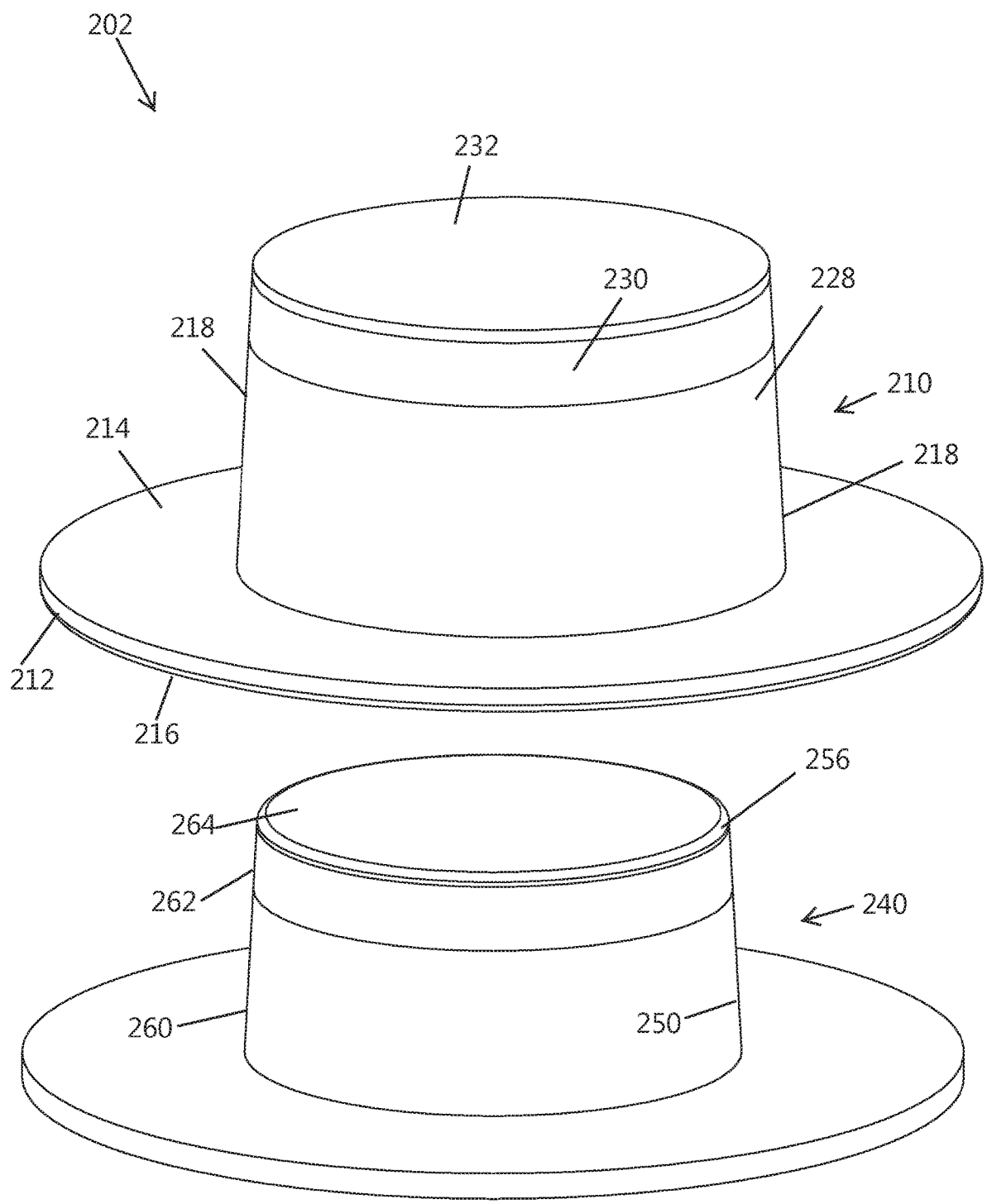
FIG. 9 is a top perspective view of an interconnect in accordance with an embodiment of the present invention.
Figure 10:
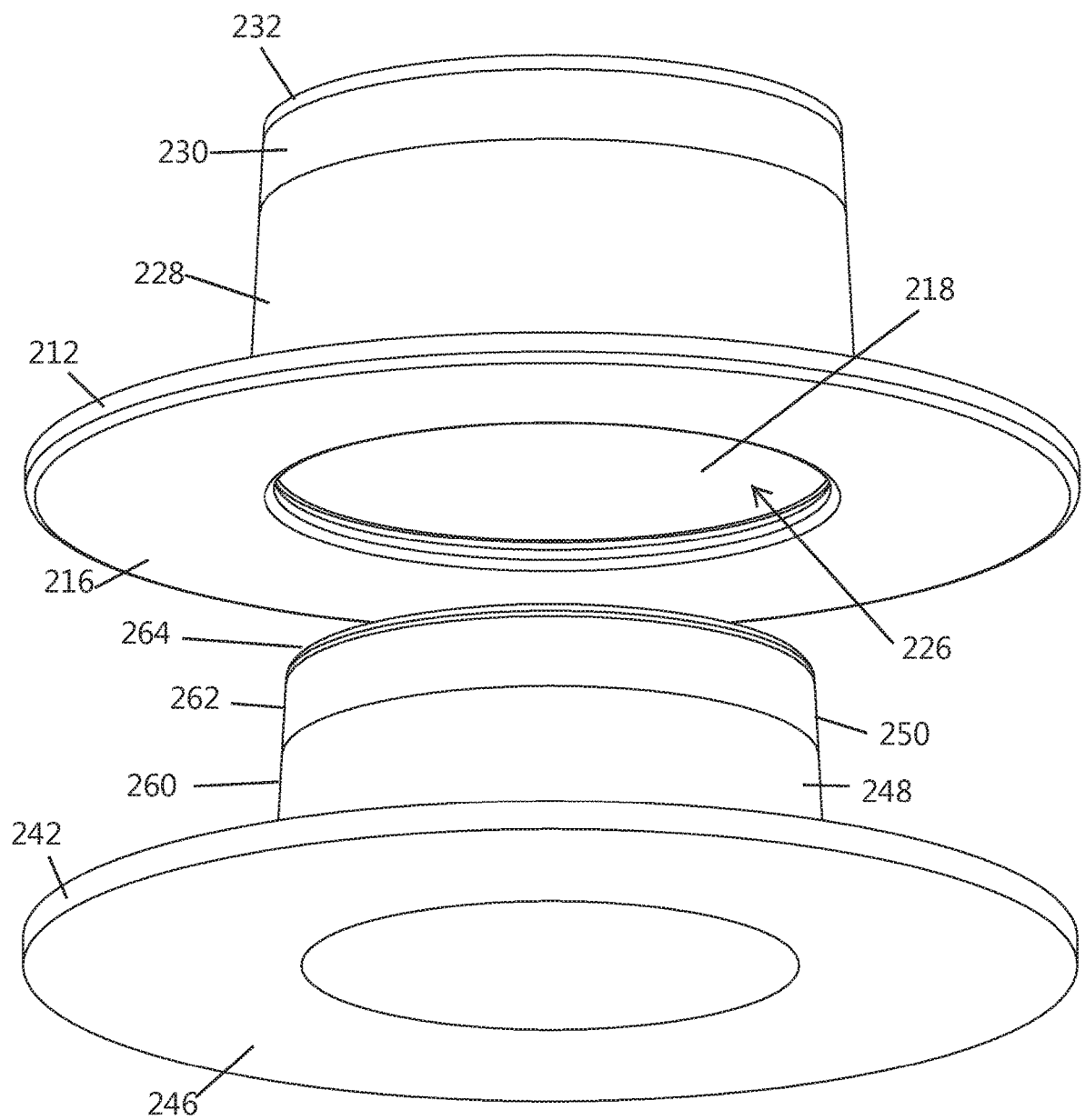
FIG. 10 is a bottom perspective view of an interconnect in accordance with an embodiment of the present invention.
Figure 11:
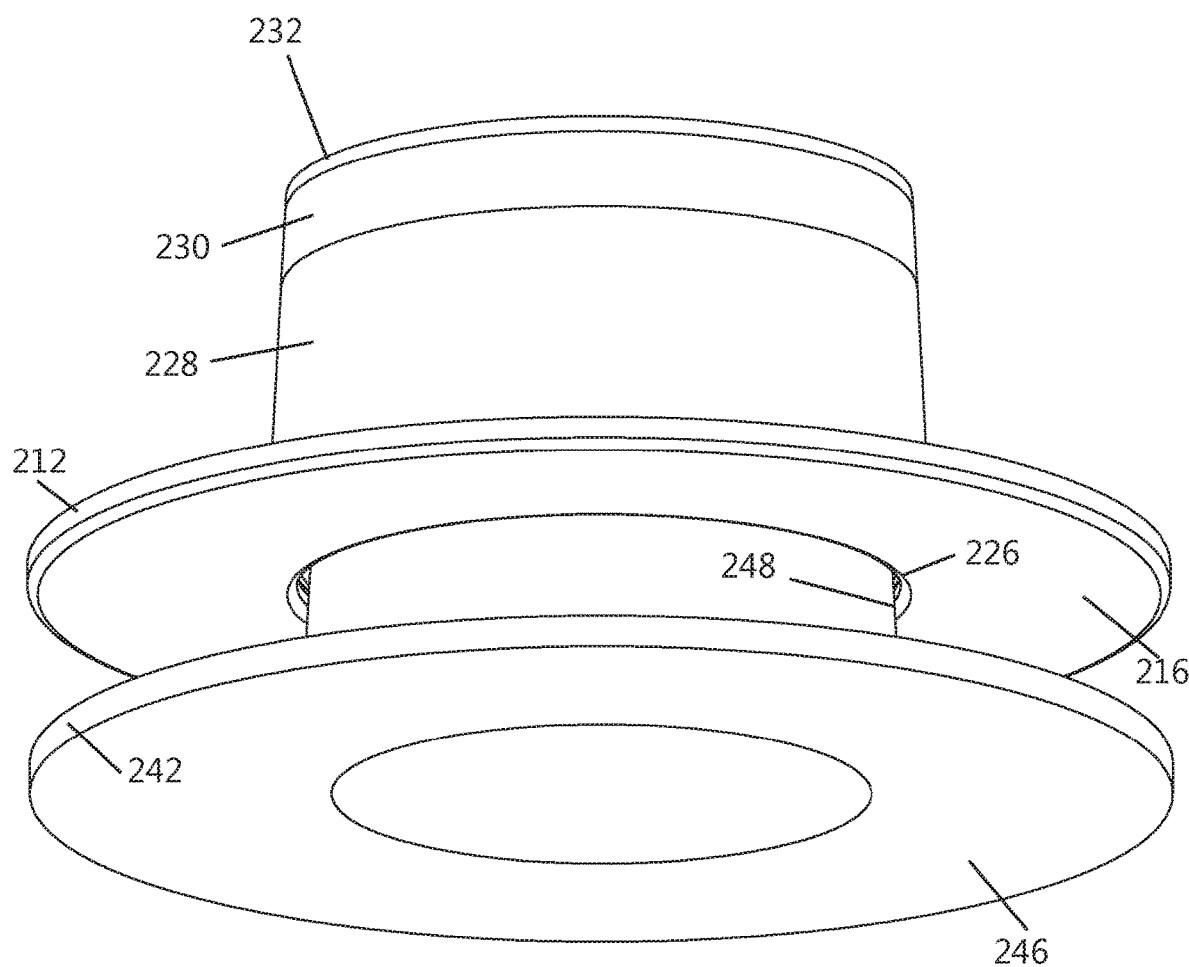
FIG. 11 is a bottom perspective view of an interconnect in accordance with an embodiment of the present invention.
Figure 12:
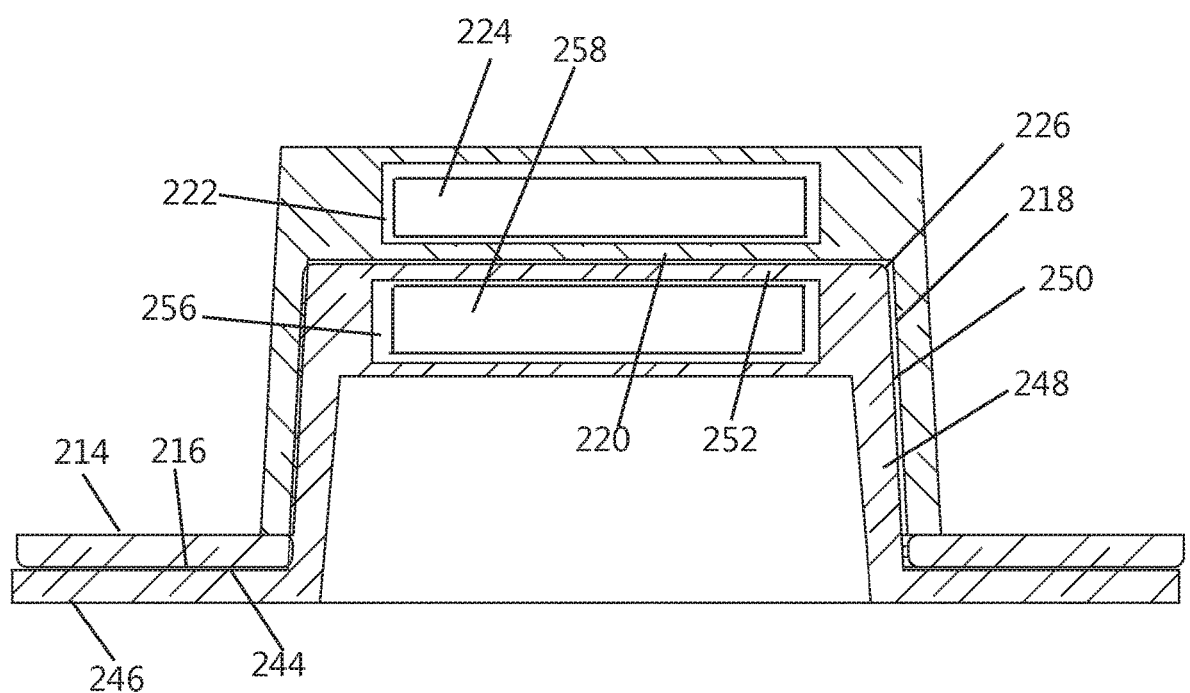
FIG. 12 is a partial sectional perspective view of an interconnect in accordance with an embodiment of the present invention.

FIG. 4 shows a retrofit decoy head 40 having rim 42 adhered to the head 40 and having protrusion 44 extending from rim 42. The protrusion 44 includes a tapered sidewall and is sized to snuggly fit within the receptacle 52 of the decoy body 50. Those skilled in the art will appreciate that the interconnect 10 of the present invention may include a rim that is sized and shaped to match the many shapes and styles of heads 40 and bodies 50 to allow sufficient adherence of the interconnect 10 to the head or body.

FIGS. 5-8 show generally an exemplary interlock 102 having contoured rims. The interlock 102 includes a first interconnect 110 having a receptacle 130. The first interconnect 110 has a rim 112 extending outwardly from the receptacle 130. The rim 112 has top 114 and bottom 116 sides that include respectively contoured surfaces 126 and 128. The receptacle 130 includes a tapered sidewall 118 that terminates at bottom 120. The bottom has a cavity 122 formed within the bottom which is sized to receive a magnet 124. The magnets utilized with the present invention are preferably neodymium magnets having an estimated pull force between 15-30 lbs. The magnets are preferably disc-shaped having sizes ranging between 0.75-1.5 inch diameters and a thickness between 0.10-0.375 inches thick. Of course, other magnets having different shapes and sizes may be utilized without departing from the scope of the invention. The magnetic field or flux lines of magnet 124 preferably align with the rim 112.

Similarly, the interlock 102 has a second interconnect 140 having a protrusion 148 that mates with receptacle 130 of the first interconnect 110. The second interconnect 140 has a rim 142 extending outwardly from the protrusion 148. The rim 142 has top 144 and bottom 146 sides that include respectively contoured surfaces 158 and 160. The protrusion 148 includes a tapered sidewall 150 that terminates at bottom 152. The bottom 152 has a cavity 154 formed within the bottom which is sized to receive a magnet 162. The outer bottom portion 152 of the protrusion 150 may be rounded or chamfered 156 such that insertion into the receptacle 130 is facilitated. The first and second interlocks 110 and 140 may be thermo molded, printed, rotary molded, blow molded or formed with other known techniques having the magnet of each interconnect enclosed or encompassed within each enclosed corresponding cavity.

Figure 13:
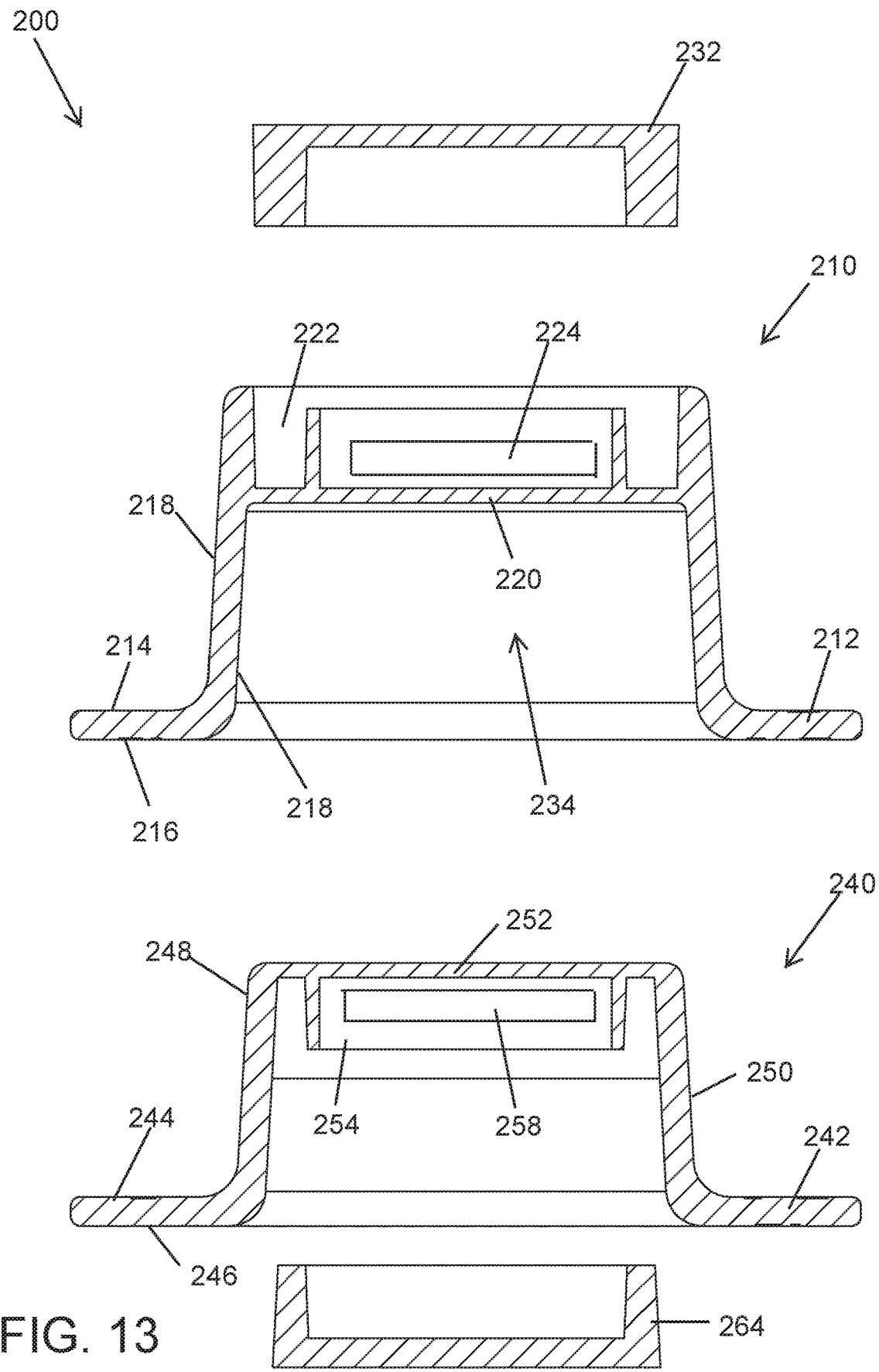
FIG. 13 is a partial sectional perspective view of an interconnect in accordance with an embodiment of the present invention.
Figure 14:
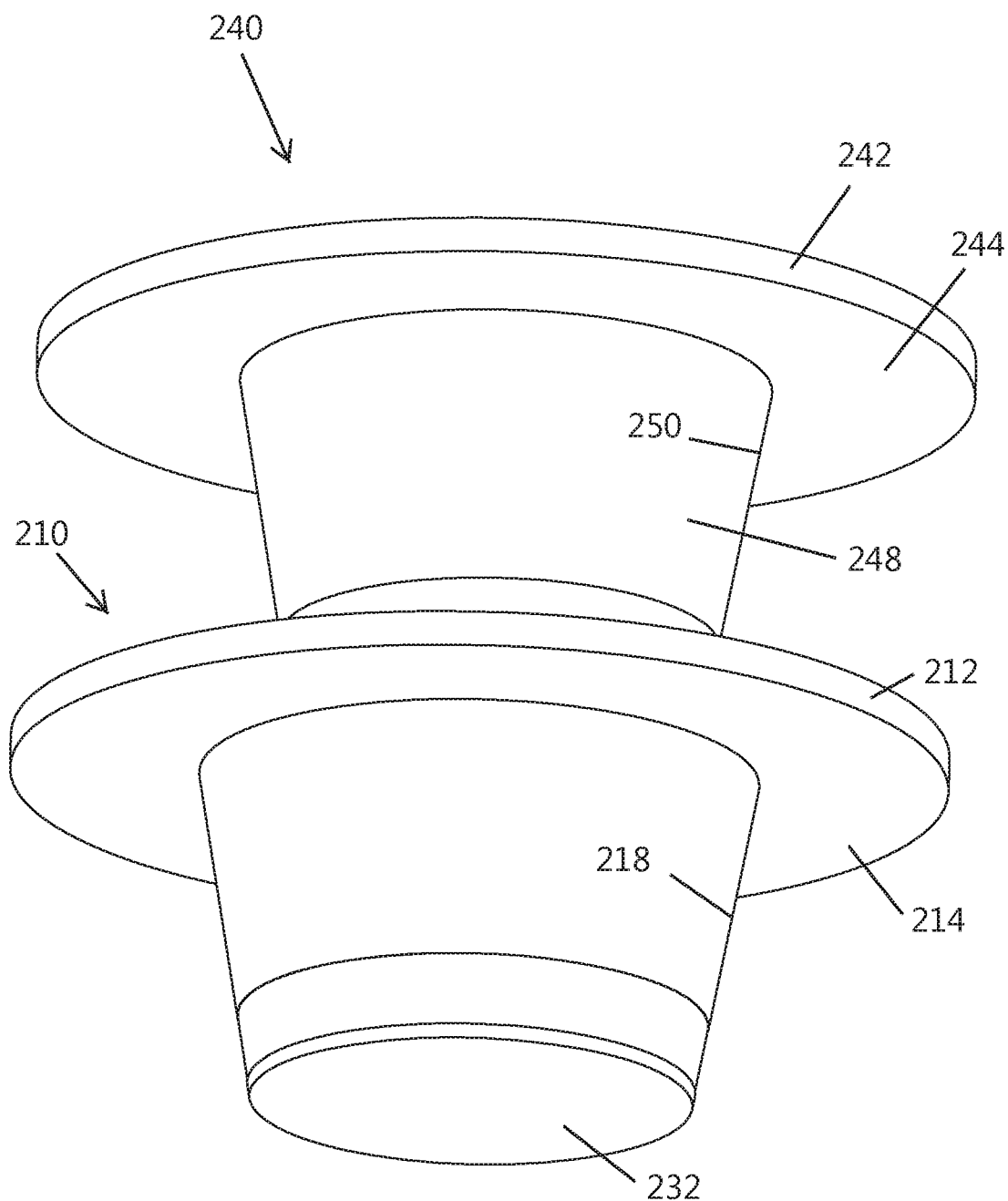
FIG. 14 is a top perspective view of an interconnect in accordance with an embodiment of the invention.
Figure 15:
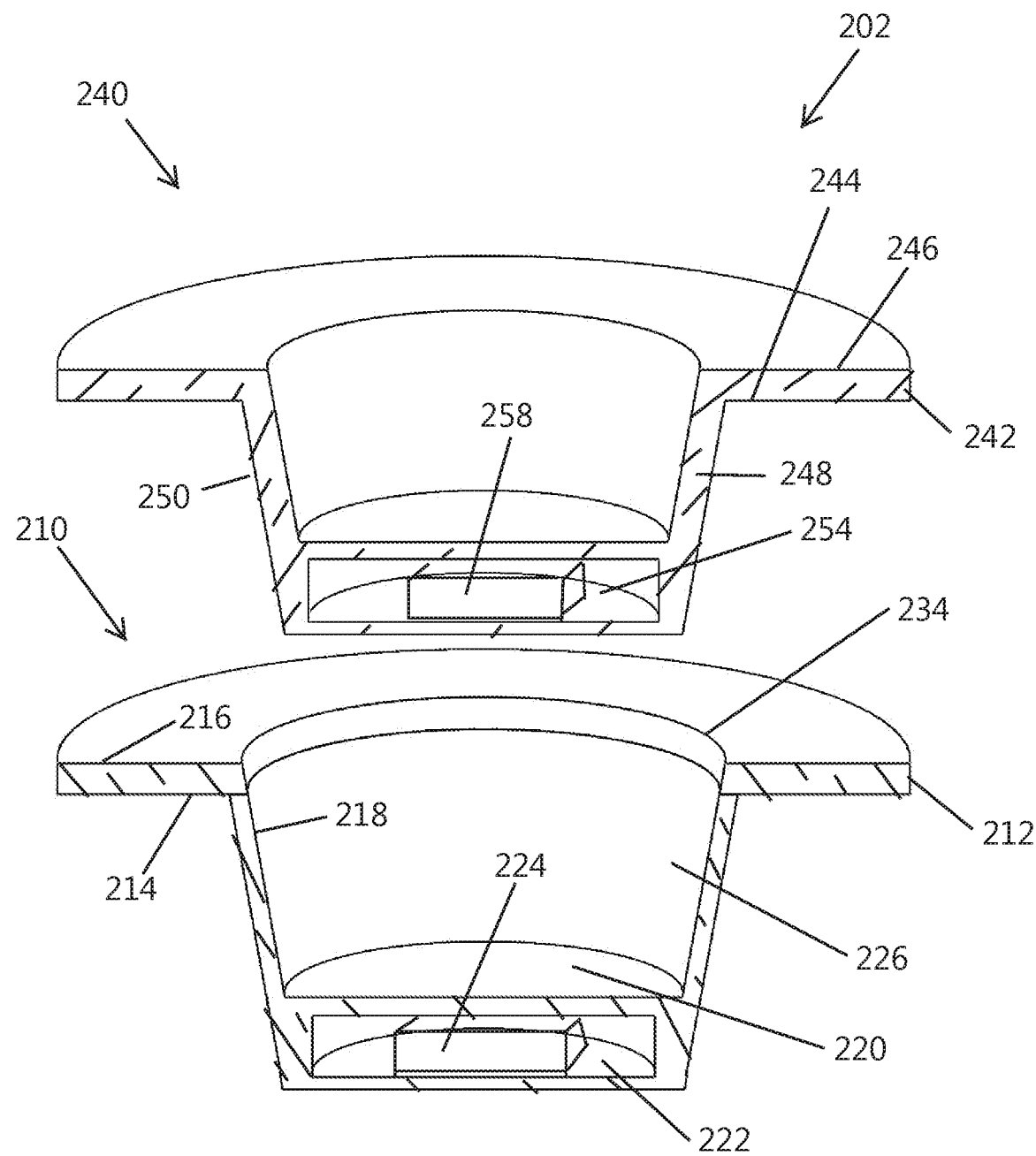
FIG. 15 is a partial sectional perspective view of an interconnect of a type similar to the interconnect shown in FIG. 14.
Figure 17:
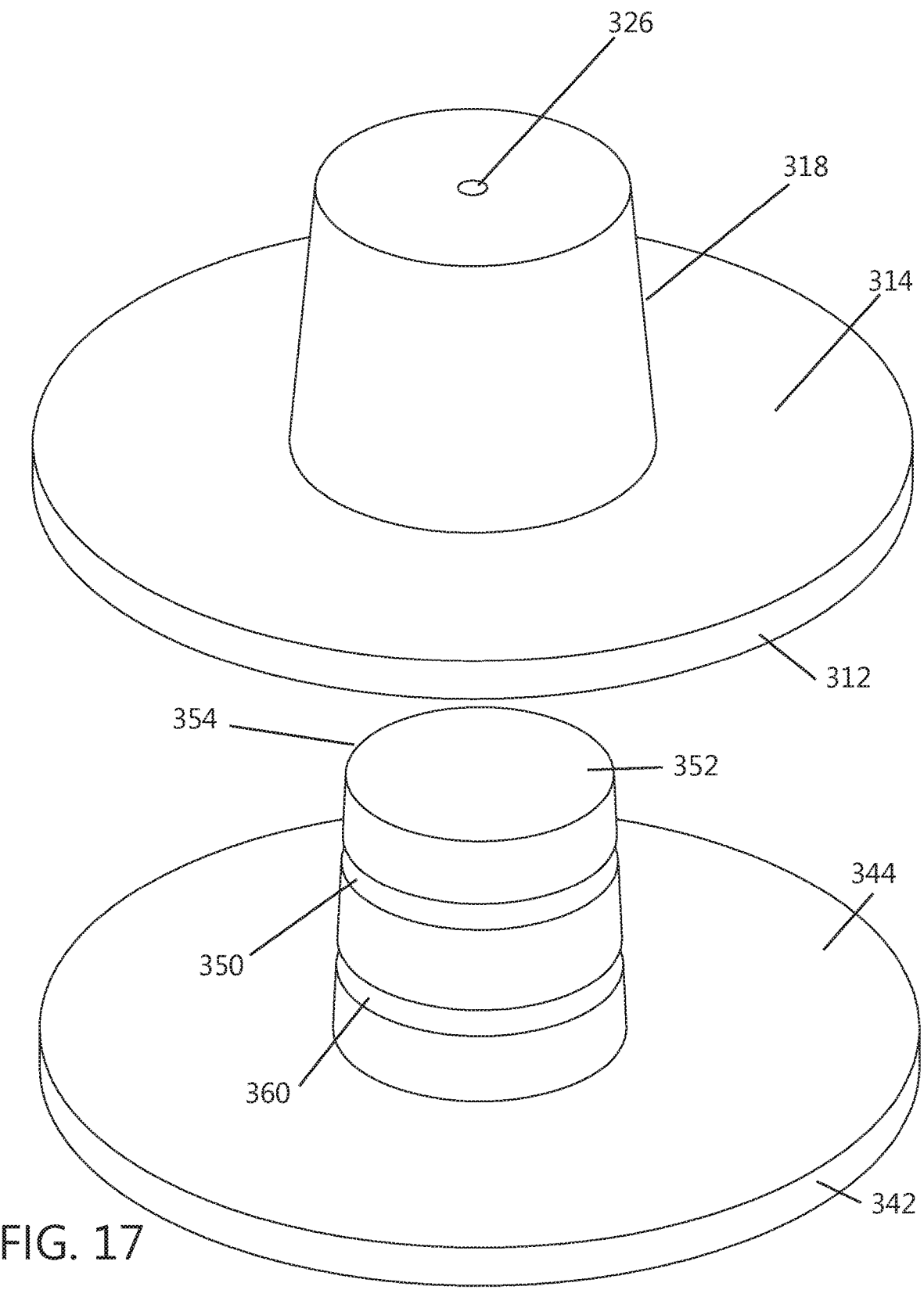
FIG. 17 is a top perspective view of an interconnect in accordance with an embodiment of the invention.
Figure 18:
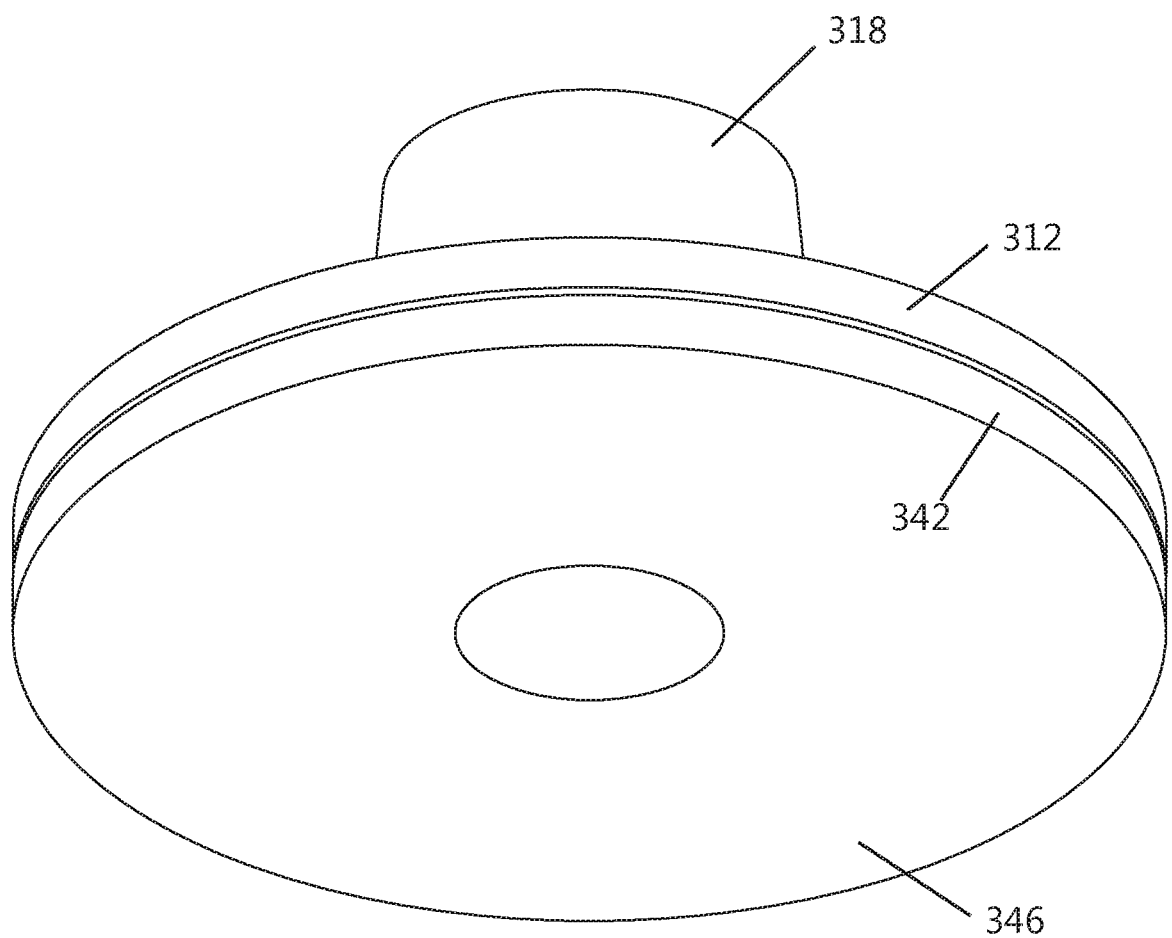
FIG. 18 is a bottom perspective view of an interconnect in accordance with an embodiment of the invention.
Figure 19:
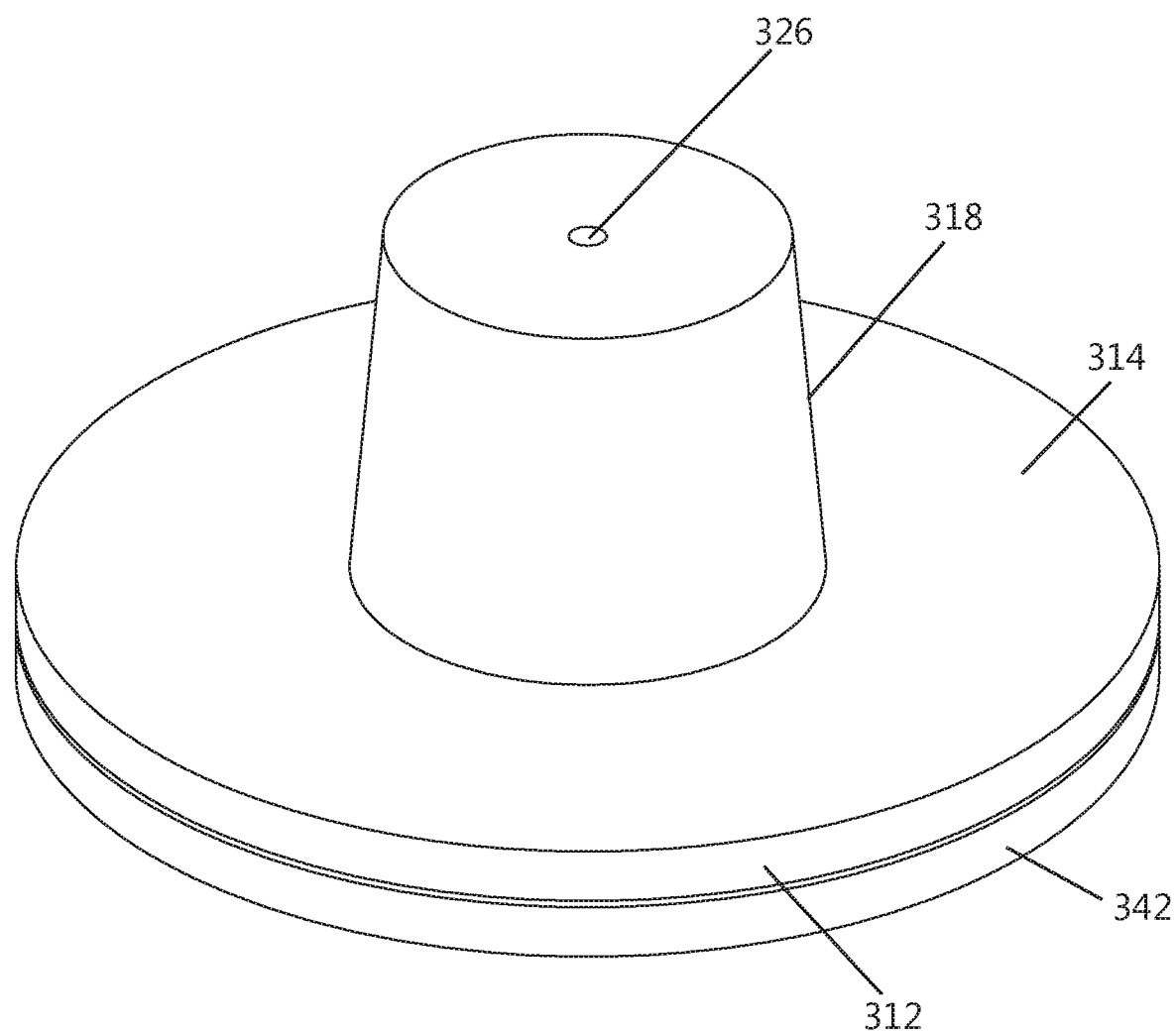
FIG. 19 is a top perspective view of an interconnect in accordance with an embodiment of the present invention.

With reference to FIGS. 9-15, an exemplary interlock 202 of an embodiment of the invention is illustrated having parallel rims. The interlock 202 includes a first interconnect 210 having a receptacle 226. The first interconnect 210 has a rim 212 extending outwardly from the receptacle 226. The rim 212 has top 214 and bottom 216 sides that include respectively flat or parallel surfaces. The receptacle 226 includes an opening 234 and tapered sidewall 218 that terminates at bottom 220. The bottom has a cavity 222 formed within the bottom which is sized to receive a magnet 224. Similarly, the interlock 202 has a second interconnect 240 having a protrusion 248 that mates with receptacle 226 of the first interconnect 210. The second interconnect 240 has a rim 242 extending outwardly from the protrusion 248. The rim 242 has top 244 and bottom 246 sides that extend outward and are parallel. The protrusion 248 includes a tapered sidewall 250 that terminates at bottom 252. The bottom 252 has a cavity 254 formed within the bottom which is sized to receive a magnet 258. The outer bottom portion 252 of the protrusion 248 may be rounded or chamfered 256 such that insertion into the receptacle 226 is facilitated. FIG. 13 illustrates top segments or caps 232 and 264 separated from the base and protrusion. After the magnets are inserted in respective cavities the caps may be sonic welded, glued or otherwise adhered to the base and protrusion, thereby enclosing the magnets within the cavities. Alternatively, as shown in FIGS. 9-11 and 14 the first and second interlocks 210 and 240 may be formed or segmented in corresponding first segments 228 and 260, middle segments 230 and 262 and outer or top segments 232 and 264. The tapered sidewall may have a draft angle of between 1-10 degrees, however, a 3 degree draft has been found to be well suited with the invention.

The multidimensional tapered surface together with the magnet attraction between the magnets of the mating interconnects provide a sufficient bind so that the head does not disengage from the decoy body when the head is used to carry the decoy. However, at the same time, a pulling force that is directly outward so that the tapered sidewalls do not engage each other results in a quick and easy way to remove the head from the body. Of course, one of the magnets may be replaced with a material that is attracted to the opposing magnet, however using two magnets has been found desirable.

As shown in FIGS. 16-19 another alternate embodiment of the invention is illustrated. FIGS. 16-19 shows generally an exemplary interlock 302 that utilizes o-rings or gaskets rather than magnets to provide a restricting force between the first and second interconnects 310 and 340. The interlock 302 includes a first interconnect 310 having a receptacle 330. The first interconnect 310 has a rim 312 extending outwardly from the receptacle 330. The rim 312 has top 314 and bottom 316 sides that include respectively flat or parallel surfaces. The receptacle 330 includes an opening 332 and tapered sidewall 318 that terminates at bottom 320. Similarly, the interlock 302 has a second interconnect 340 having a protrusion 348 that mates with receptacle 330 of the first interconnect 310. The second interconnect 340 has a rim 342 extending outwardly from the protrusion 348. The rim 342 has top 344 and bottom 346 sides that extend outward and are parallel. The protrusion 348 includes a tapered sidewall 350 that terminates at bottom 352. The tapered sidewall 350 includes annular grooves 358 and 360 that are adapted for receiving an o-ring or gasket. The outer bottom portion 352 of the protrusion 348 may be rounded or chamfered 354 such that insertion into the receptacle 330 is facilitated. The first interconnect 310 includes an aperture or hole 326 extending through the bottom 320 to allow air to escape as the first interconnect 310 is press fit into the second interconnect 340.

Figure 20:
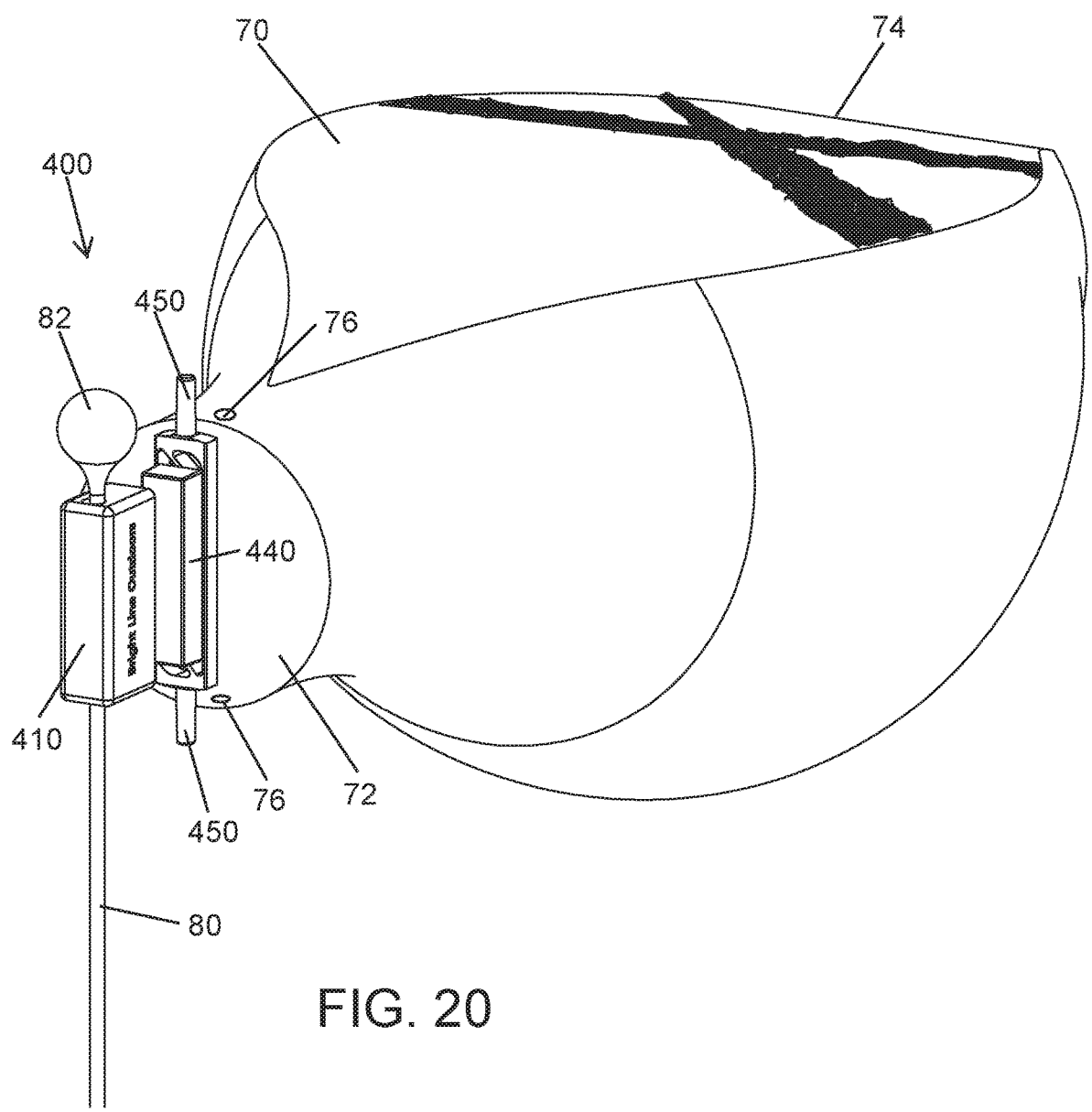
FIG. 20 is a front perspective view of an interlock in accordance with an embodiment of the invention connecting the stake (head) and wind sock (body) of a wind sock snow goose decoy of the present invention.
Figure 21:
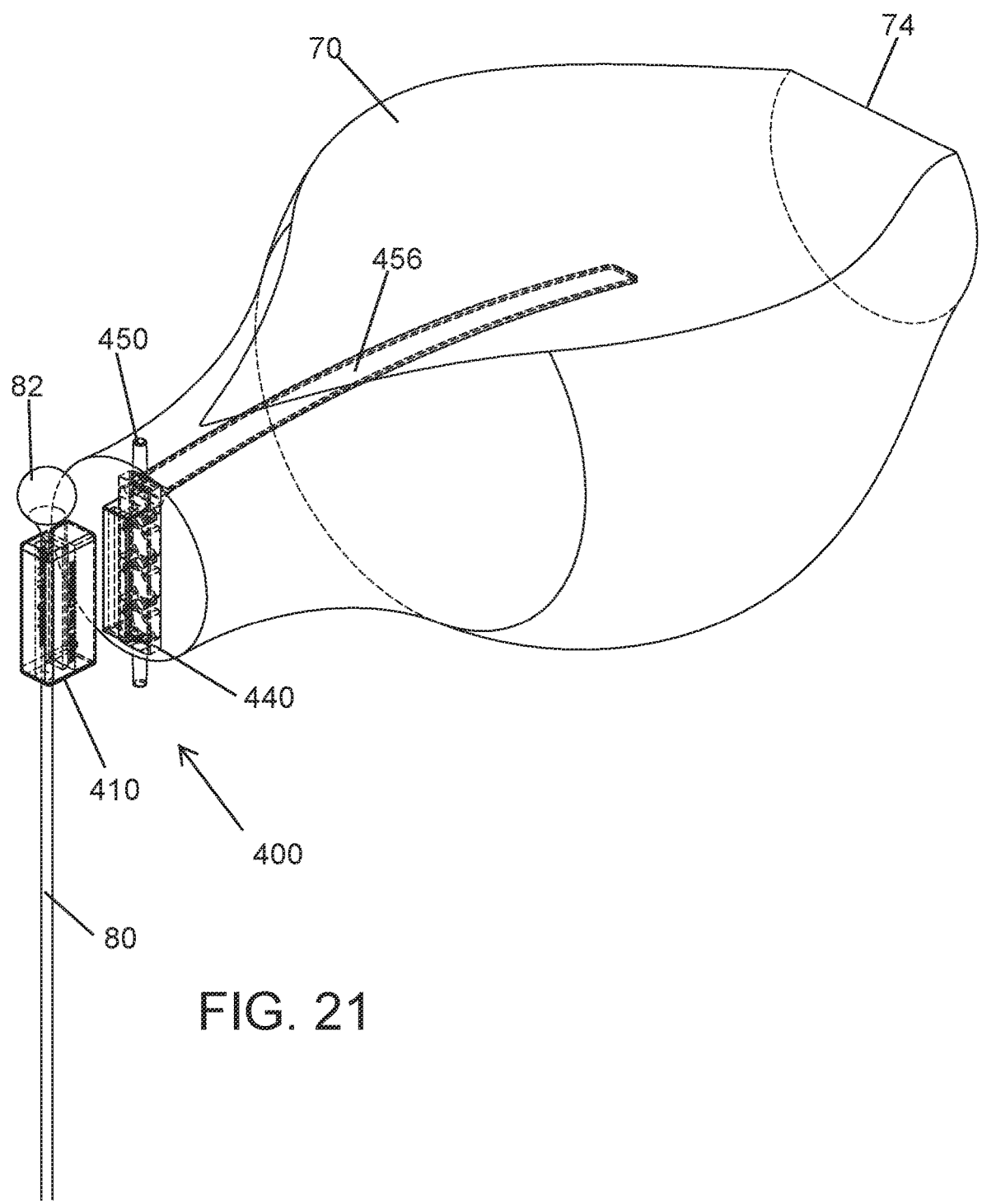
FIG. 21 is a front perspective view of an interlock in accordance with an embodiment of the invention connecting the stake (head) and wind sock (body) of a wind sock snow goose decoy of the present invention.
Figure 22:
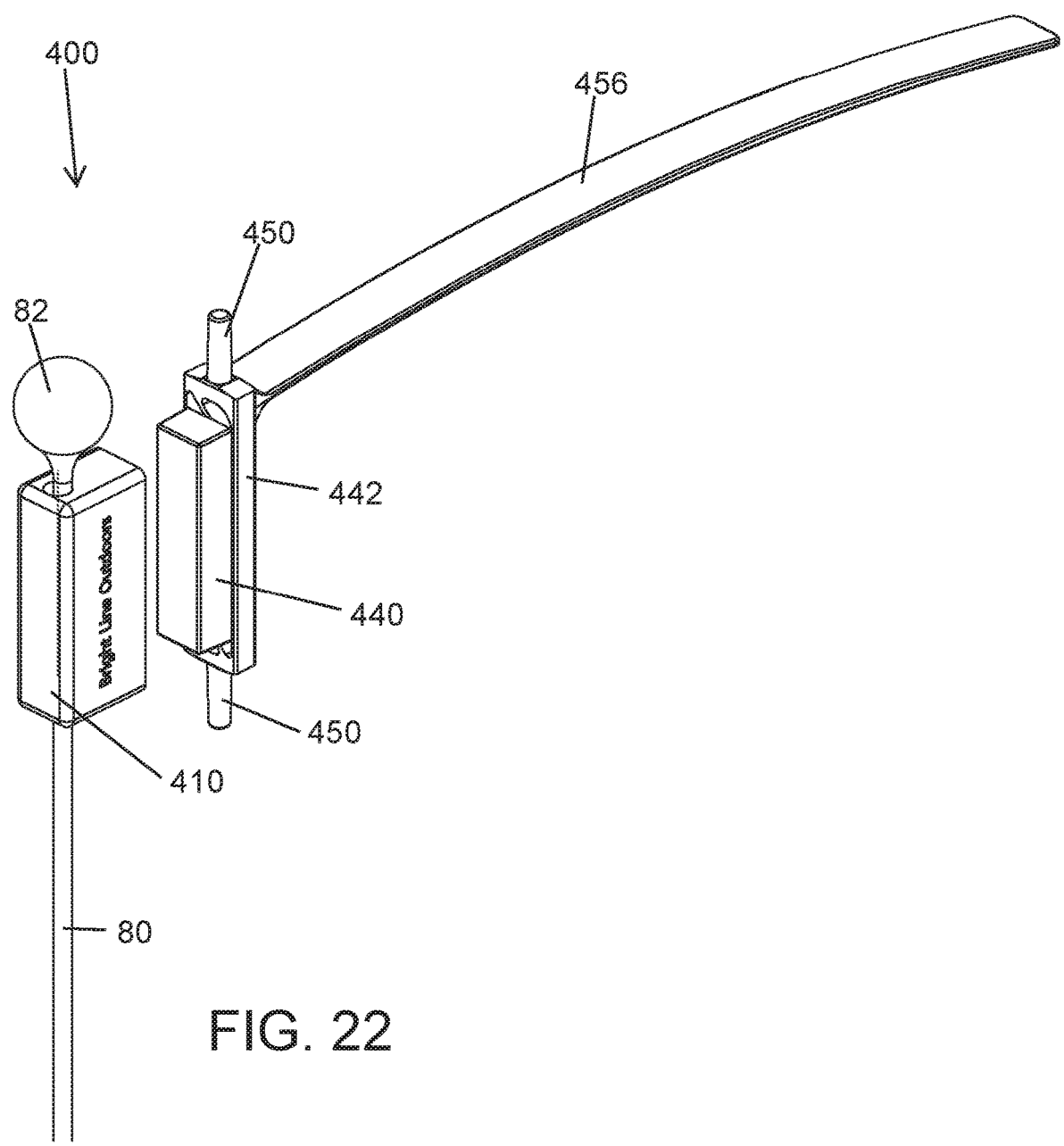
FIG. 22 is a front perspective view of an interlock in accordance with an embodiment of the invention without the wind sock (body) of the present invention.
Figure 23:
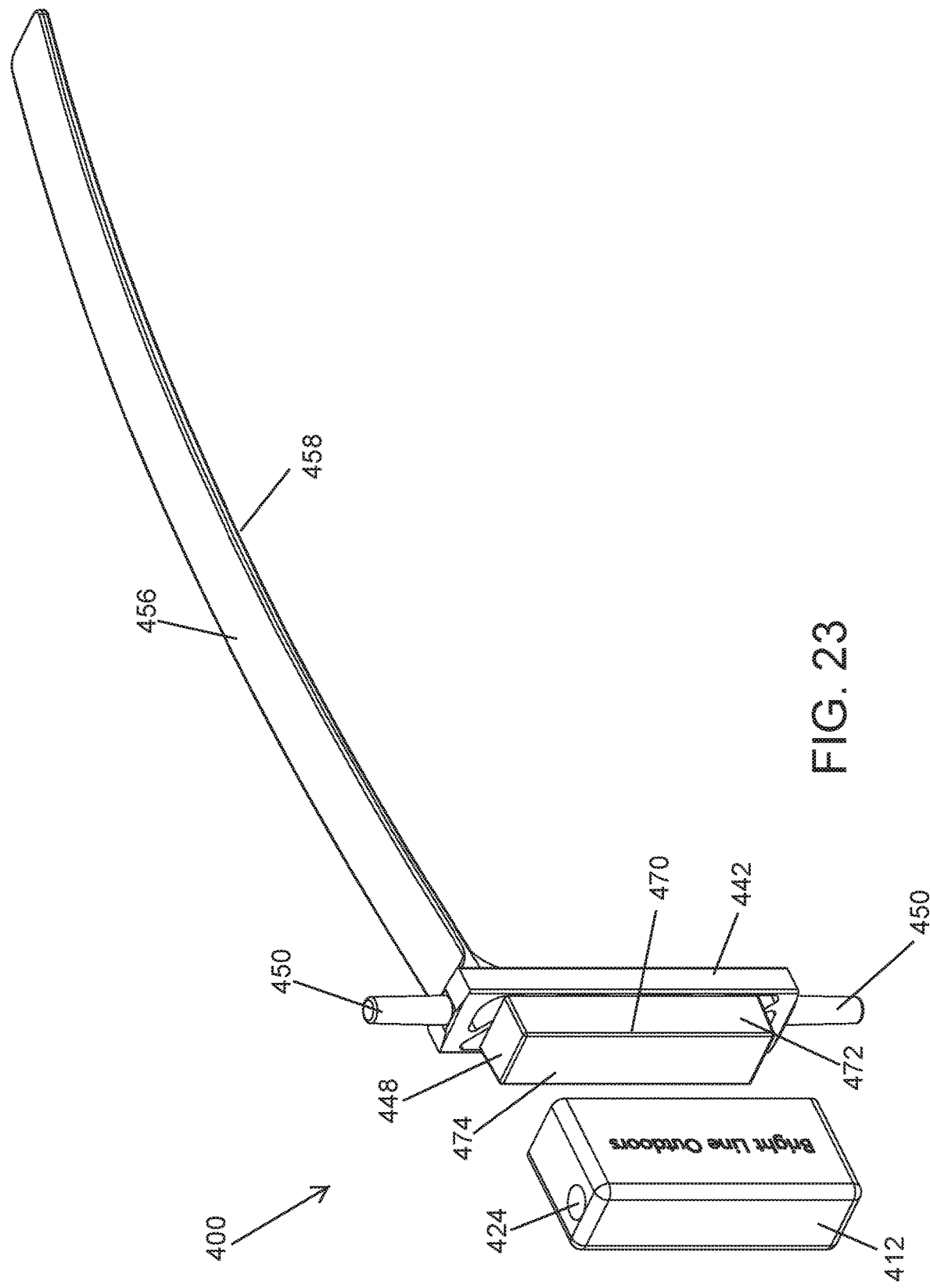
FIG. 23 is a front perspective view of an interlock in accordance with an embodiment of the invention without the stake (head) and wind sock (body) of the present invention.
Figure 24:
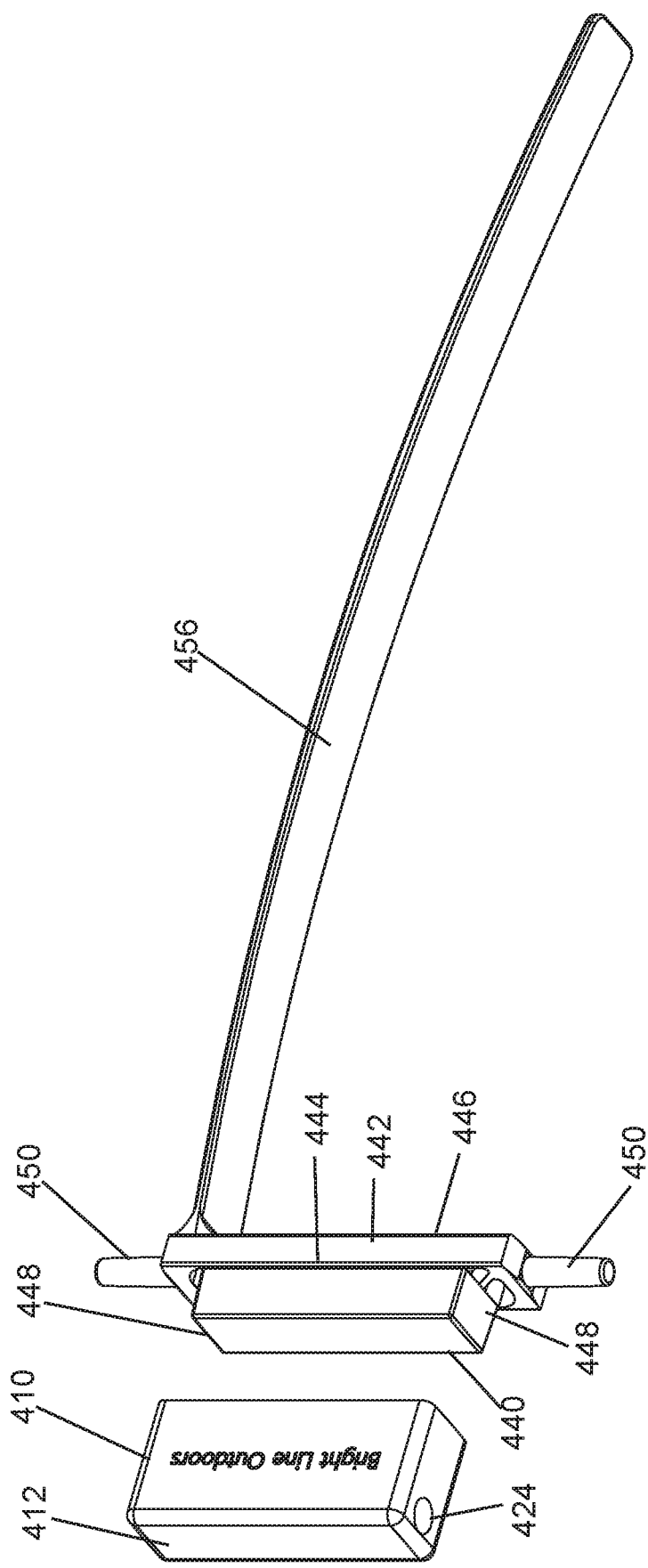
FIG. 24 is a front side perspective view of an interlock in accordance with an embodiment of the invention without the wind sock (body) of the present invention.
Figure 25:
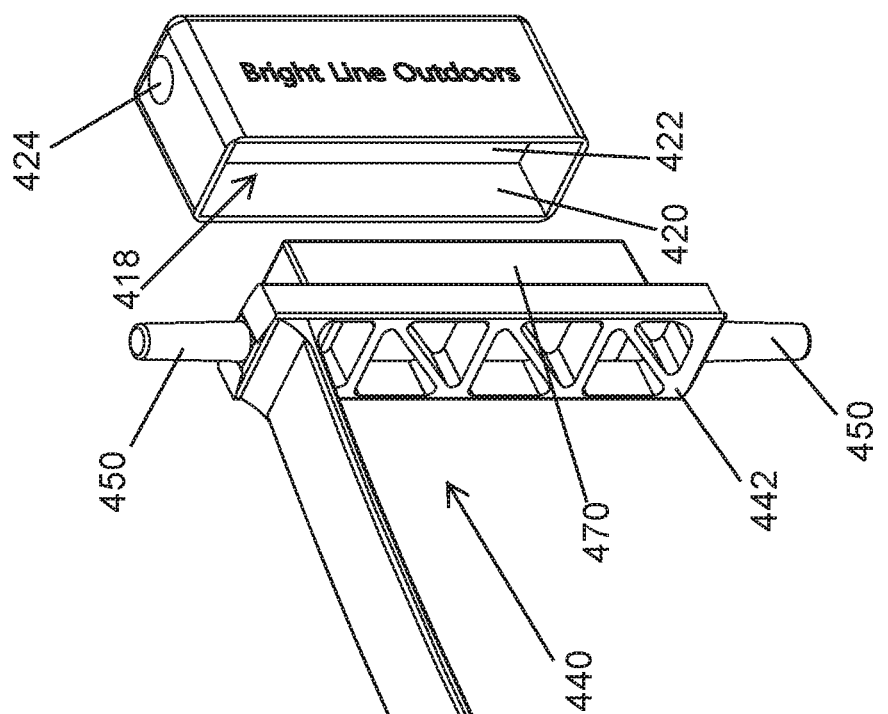
FIG. 25 is a back, side perspective view of an interlock in accordance with an embodiment of the invention without the wind sock (body) of the present invention.
Figure 26:
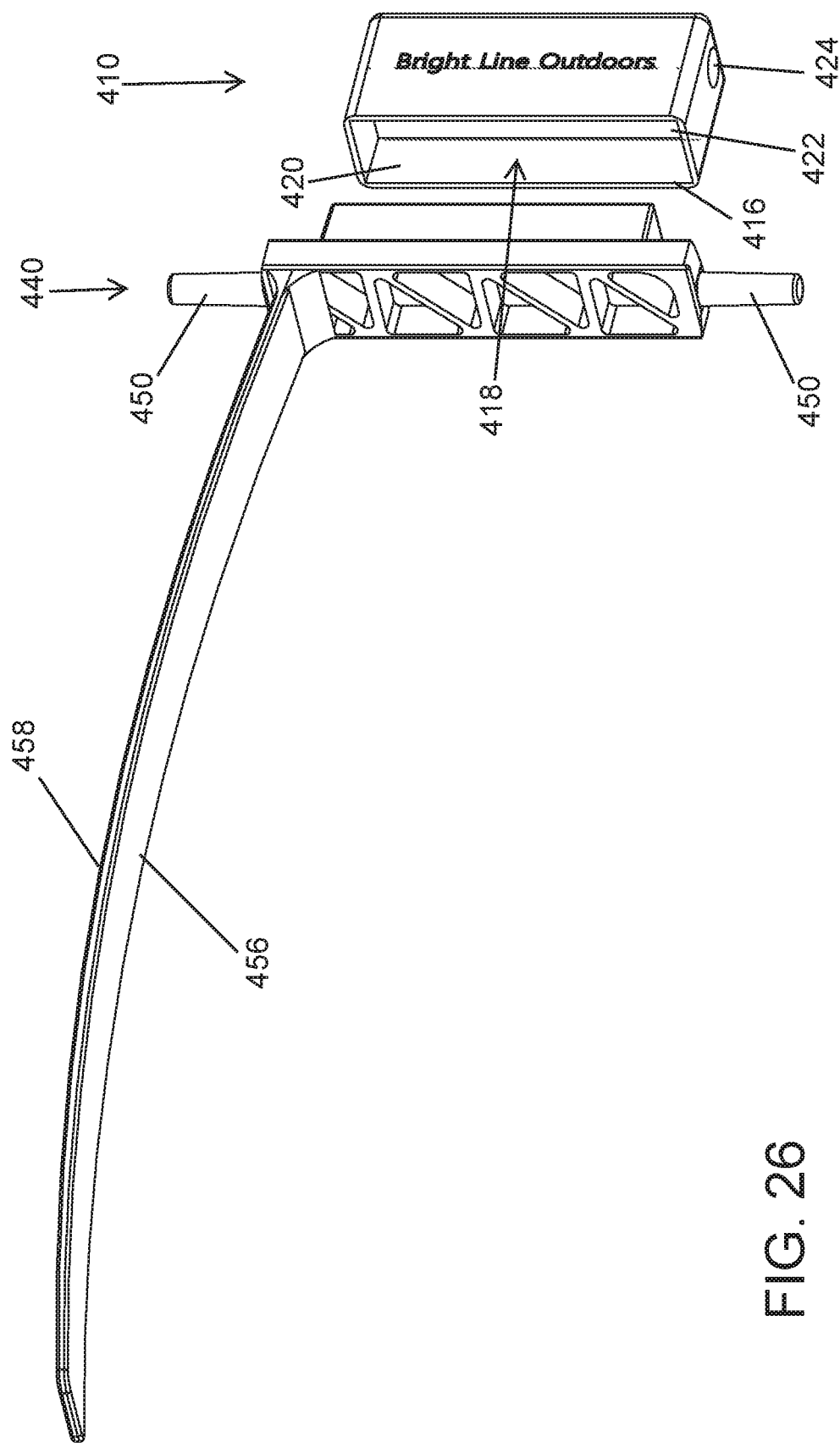
FIG. 26 is a lower back side perspective view of an interlock in accordance with an embodiment of the invention without the wind sock (body) of the present invention.
Figure 27:
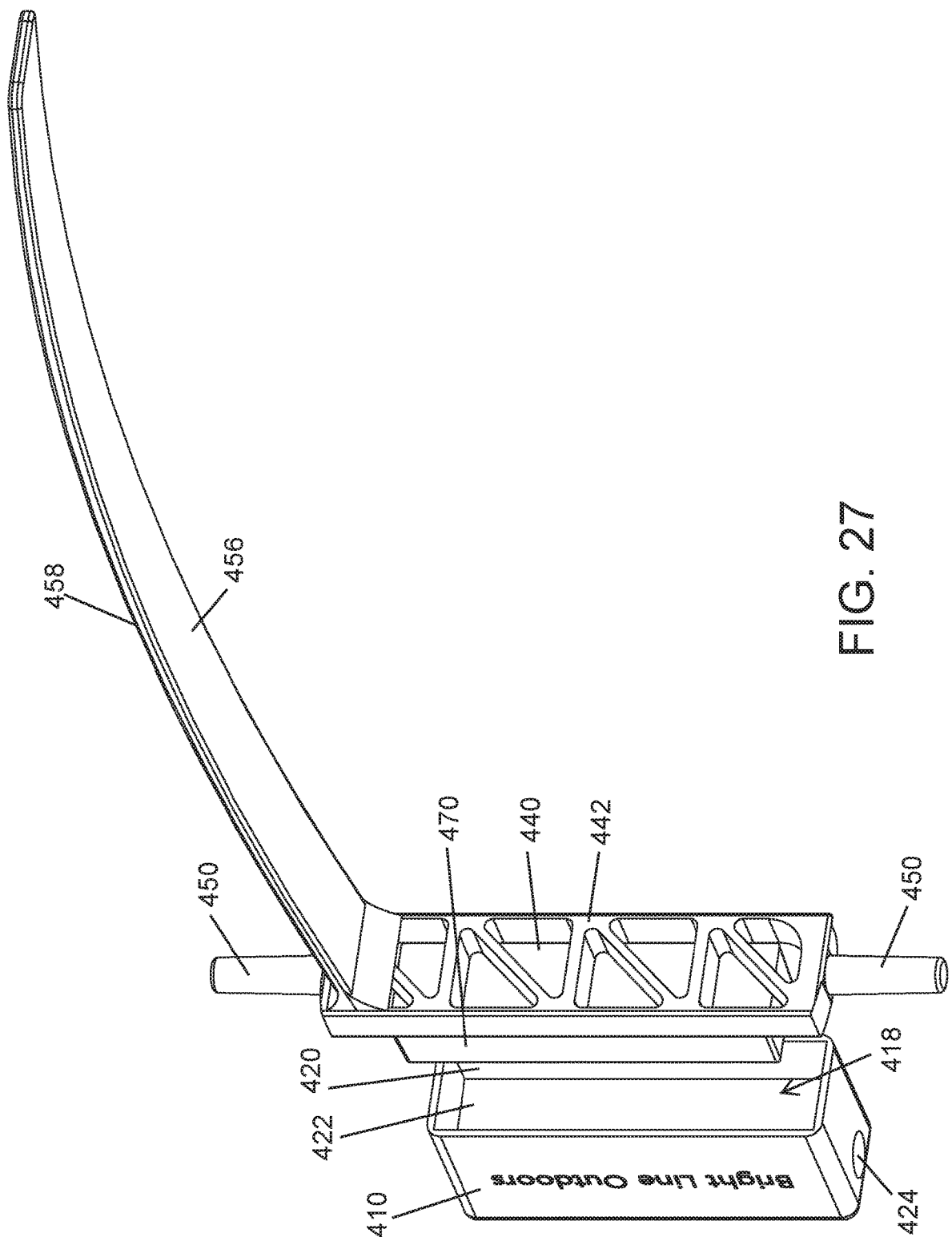
FIG. 27 is a back perspective view of an interlock in accordance with an embodiment of the invention without the wind sock (body) of the present invention.
Figure 28:
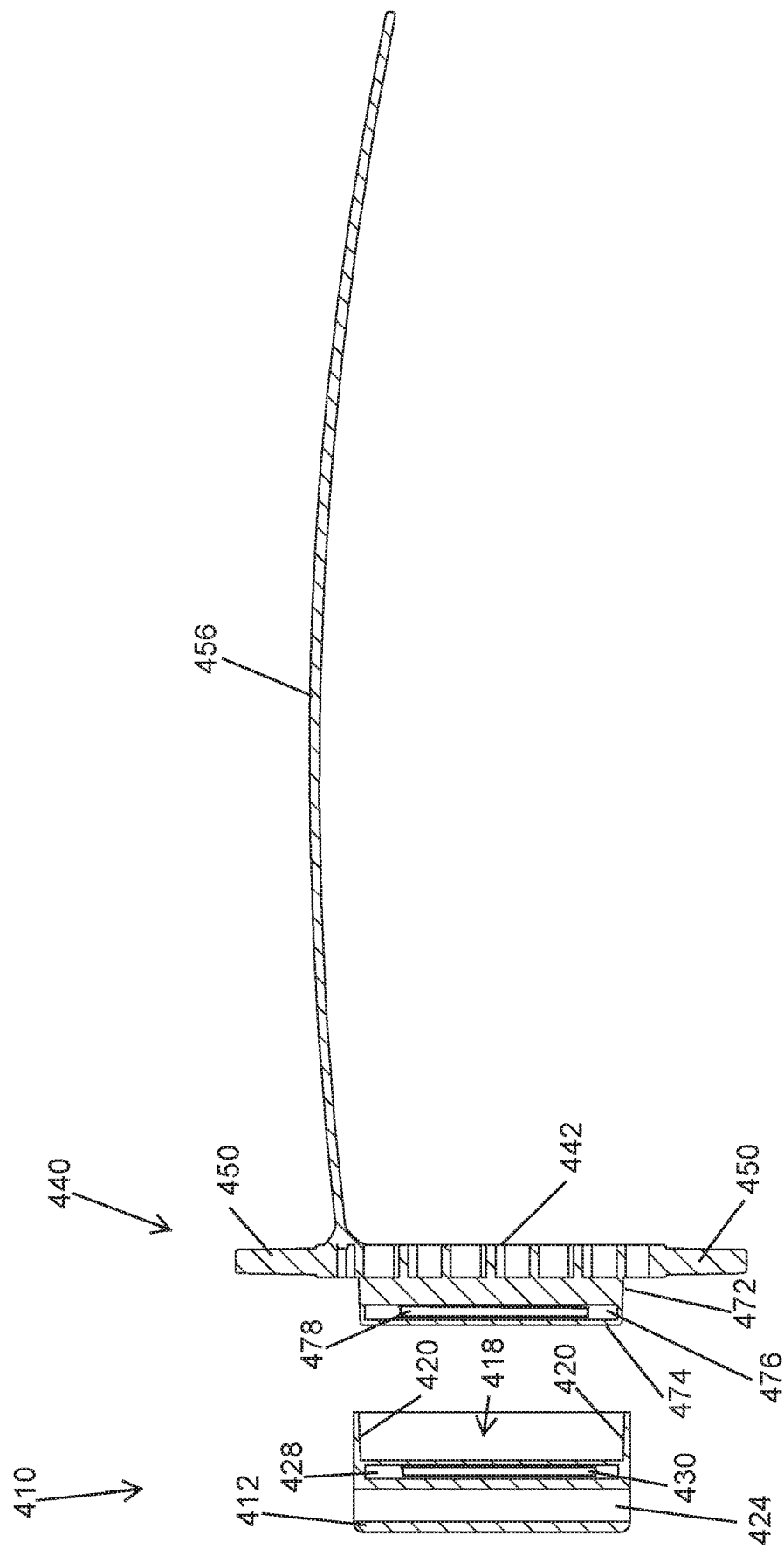
FIG. 28 is a partial sectional side view of an interlock in accordance with an embodiment of the invention without the wind sock (body) of the present invention.

As shown in FIGS. 20-21 a sock assembly is illustrated having a sock or shape changeable body portion 70 supported by an interconnect or interlock 400 of the present invention coupled to stake 80. In the presence of a slight wind or breeze air flows through the open end 72 and into the sock or bag 70. The enclosed end 74 traps the blowing air within the sock and keeps the sock inflated. In the absence of a wind or breeze the extension or backbone 456 provides an appearance that the sock is inflated and better resembles the body of a waterfowl. The interlock 400 of the present invention includes a first interlock or connector 410 and mating second interlock or connector 440. The first connector 410 couples to stake 80 and the second connector 440 interconnects with the sock 70. The interconnect 440 includes prongs 450 extending from ends 448 of the base 442 of the connector 440. These prongs 450 insert through grommets or holes 76 formed in the bag 70. Once the prongs are inserted the connector 440 may remain coupled to the sock 70. Stakes 80 having connector 410 attached may be placed and inserted in the field in a variety of desired patterns. Magnets embedded in the connectors, together with the tapered sidewall of each connector, draw the first and second connector together and hold the connector in place even during a heavy wind or breeze.

With reference to FIGS. 22-28 the interlock 400 of the present invention will be described in greater detail. The interlock 400 includes a first interconnect 410 having a receptacle 418. The first interconnect 410 has a base portion 412 having a top and bottom 416 and into which the receptacle 418 is formed. An aperture or hole 424 extends through the base portion 412 and is adapted for slidingly engaging or otherwise receiving the stake 80. The receptacle 418 includes an open end and tapered sidewall 420 that terminates at bottom 422. The bottom 422 has a cavity 428 formed within the bottom which is sized to receive a magnet 430. Similarly, the interlock 400 has a second interconnect 440 having a protrusion 470 that mates with receptacle 418 of the first interconnect 410. The second interconnect 440 has a base 442 having a front, back and ends 444, 446, and 448 respectively. Sock prongs 450 extend outward from the ends 448 of the base 442. An extension or backbone 456 extends from the base 442 and provides support to an interior of the sock 70. The extension incudes a curvature 458 that creates a further three dimensional appearance of the sock 70.

The protrusion 470 includes a tapered sidewall 472 that terminates at bottom 474. The bottom 474 has a cavity 476 formed within the bottom which is sized to receive a magnet 478. The outer edges of the protrusion 470 may be rounded or chamfered such that insertion into the receptacle 418 is facilitated. Although the receptacle 418 and protrusion 470 are illustrated as a rectangle, those skilled in the art will appreciate that a non symmetric shape may be utilized to ensure a single upright orientation of the first and second interlocks 410 and 440. Further, although the cavities are shown enclosed and the magnets embedded, those skilled in the art will appreciate that the base 412 and bottom 474 may be split with caps separated from the base and bottom. After the magnets are inserted in respective cavities the caps may be sonic welded, glued or otherwise adhered to the base and protrusion, thereby enclosing or encapsulating the magnets within the cavities. The tapered sidewalls may have a draft angle of between 1-10 degrees, however, a 3 degree draft has been found to be well suited with the invention.

The multidimensional tapered surface together with the magnetic attraction between the magnets of the mating interconnects provide a sufficient hold so that the sock does not disengage from the stake when the sock inflates in heavy winds. Advantageously, a pulling force that is directly outward so that the tapered sidewalls do not engage each other results in a quick and easy way to remove the sock from the stake. Of course, one of the magnets may be replaced with a material that is attracted to the opposing magnet, however using two magnets has been found desirable.

Figure 29:
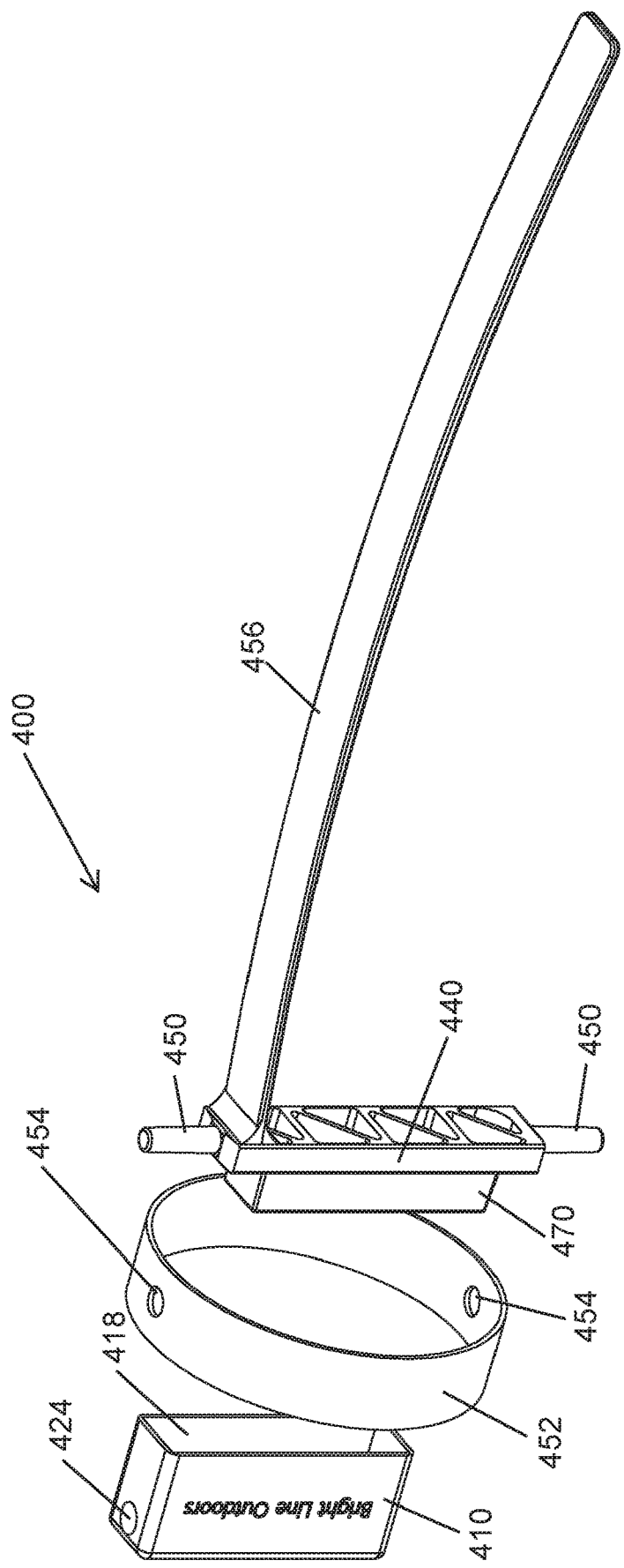
FIG. 29 is a back, side perspective view of an interlock in accordance with an embodiment of the invention having an expansion ring and illustrated without the wind sock (body) of the present invention.
Figure 30:
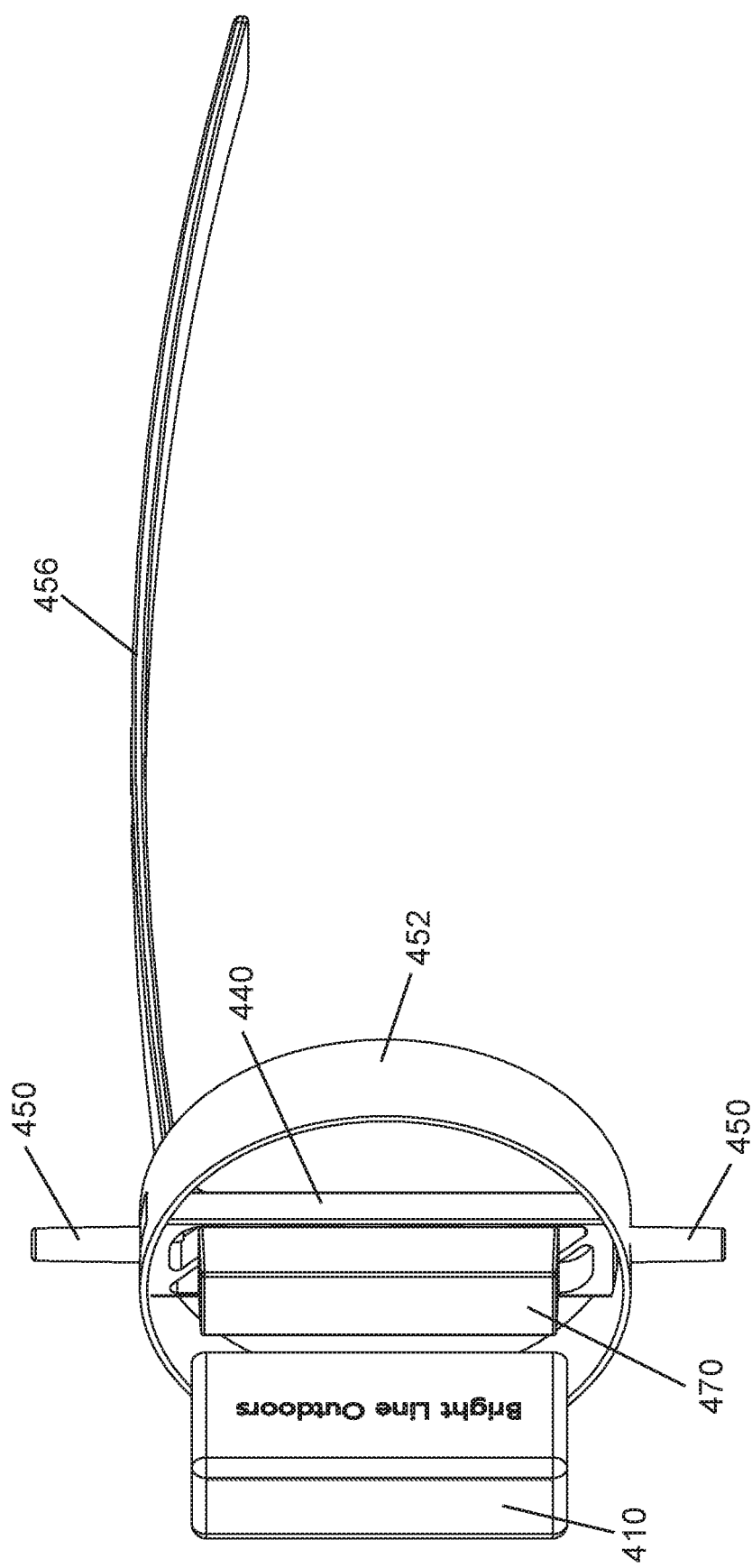
FIG. 30 is a front, side perspective view of an interlock in accordance with an embodiment of the invention having an expansion ring of the type shown in FIG. 29.
Figure 31:
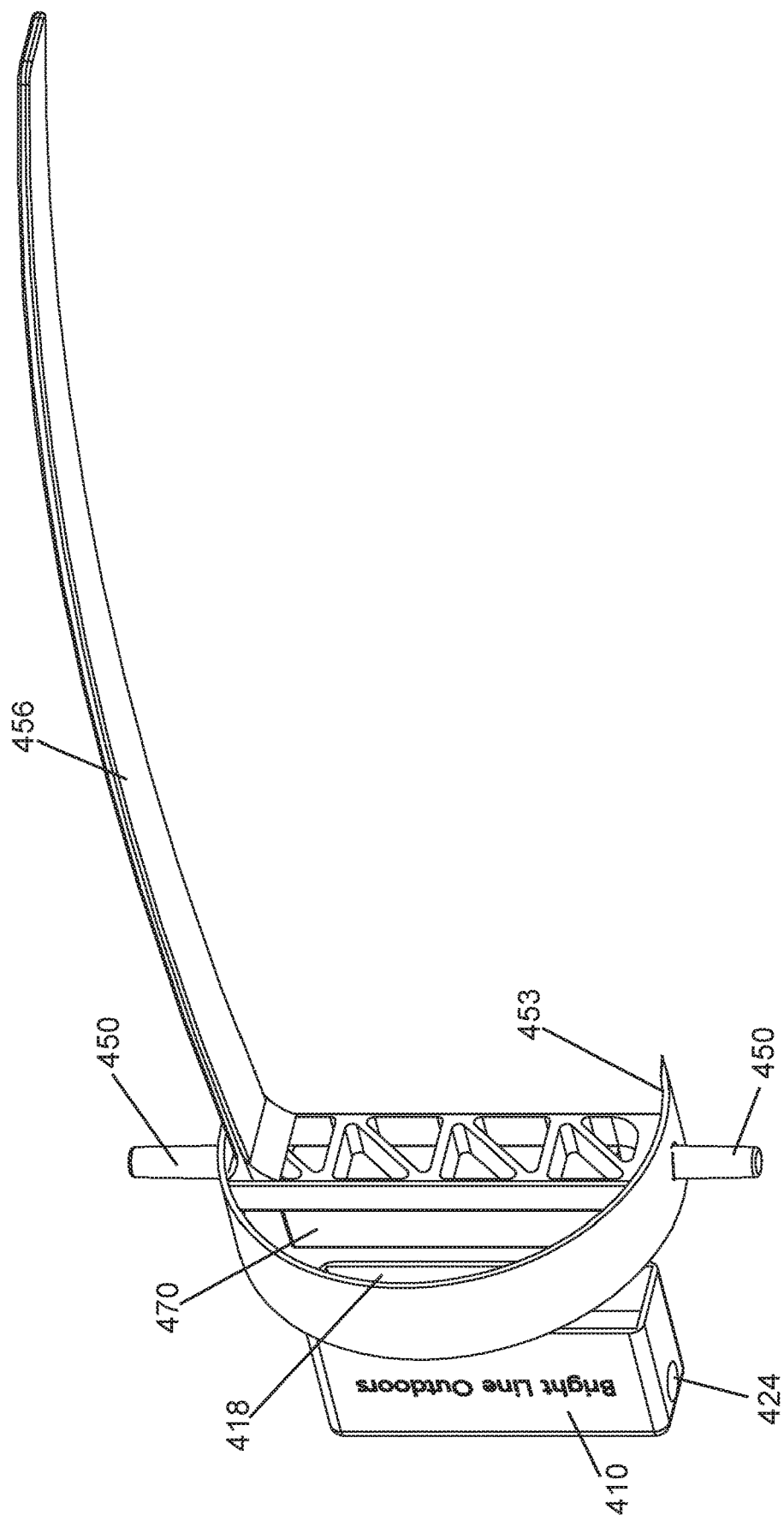
FIG. 31 is a back, side perspective view of an interlock in accordance with an embodiment of the invention having an expansion ring of the type shown in FIG. 29.

Referring now to FIGS. 29-31 the interlock 400 of the present invention is illustrated having an annular ring 452 coupled to the second interconnect 440. Ring 452 includes prong apertures 454 that are adapted to receive the prongs 450 of the connector 440. The ring 452 provides a defined opening for the flexible shape changeable sock 70, thereby ensuring an opening of the open end 72 of the sock 70. It has been found that when a half ring or semi circular ring 453 (see FIG. 31) is used instead, the ring side keeps the sock opening 72 defined while the side absent a ring tends to collapse slightly. Less air tends to enter the sock 70 from the ringless side of the opening as compared to the ring defined opening. This variance in air entering the sock tends to create a swirling within the bag and creates more movement of the sock or bag 70 in a slight breeze.

Figure 32:
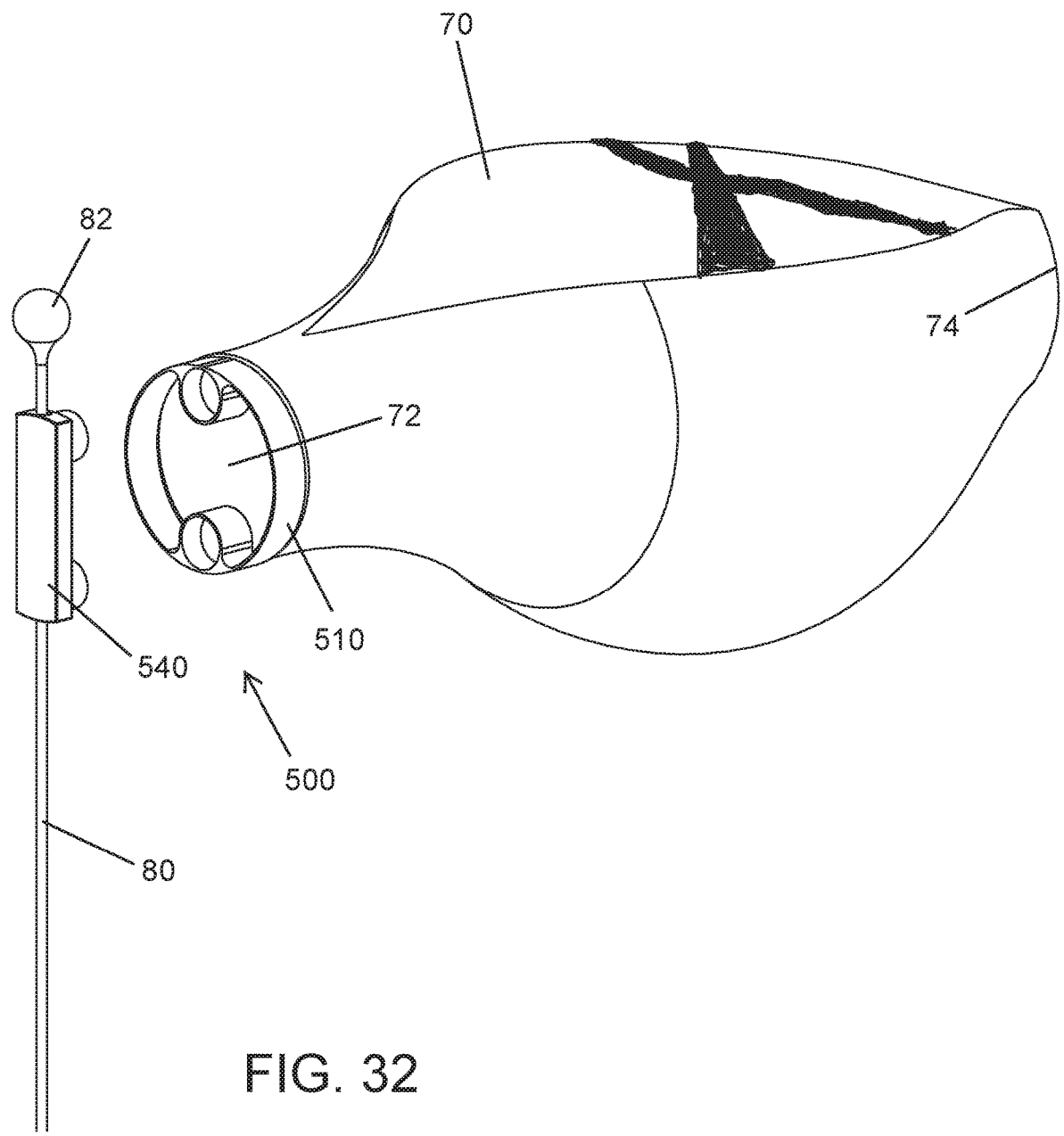
FIG. 32 is a front perspective view of an interlock in accordance with an embodiment of the invention connecting the stake (head) and wind sock (body) of a wind sock snow goose decoy of the present invention.
Figure 33:
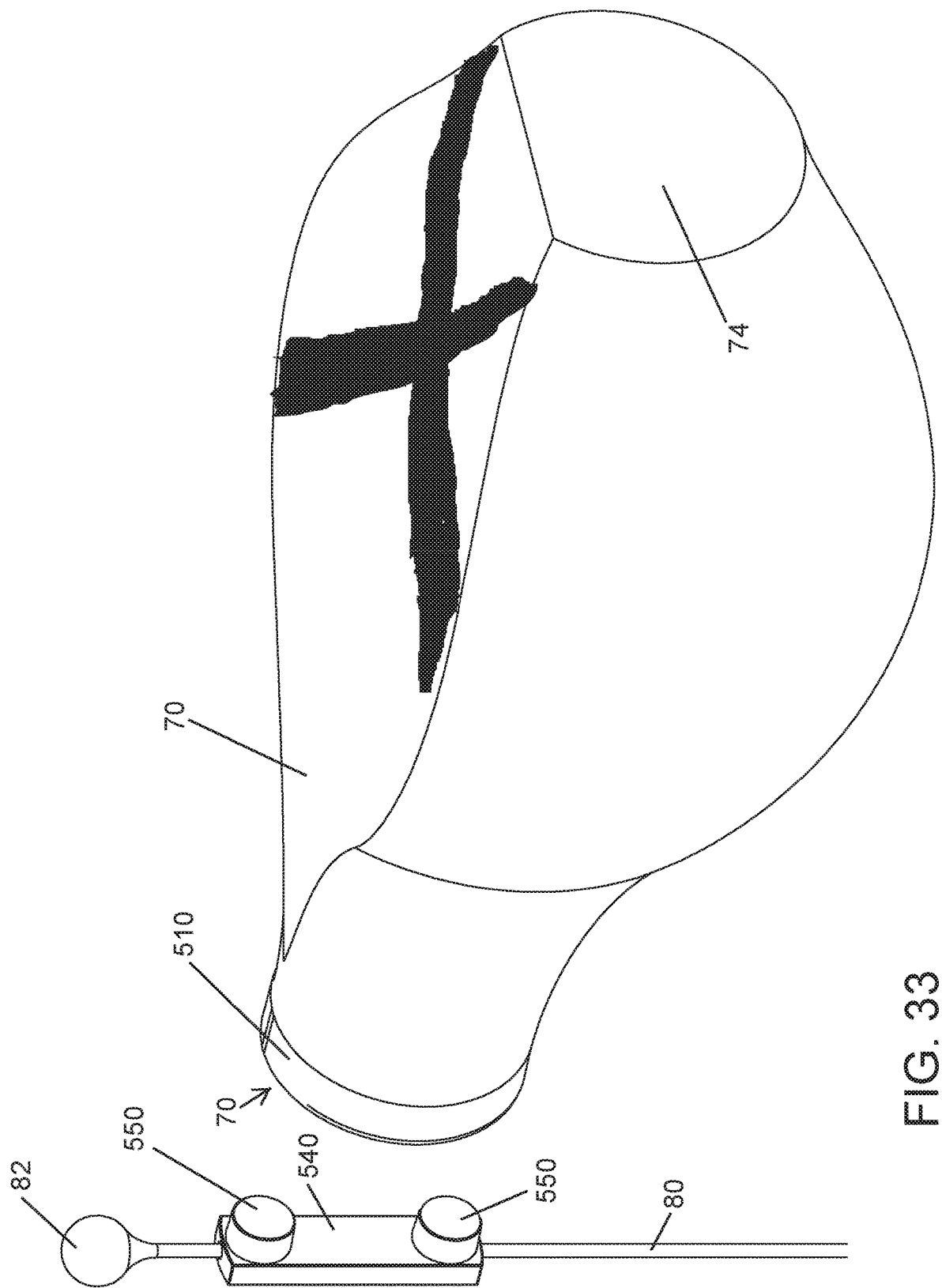
FIG. 33 is a back perspective view of an interlock in accordance with an embodiment of the invention connecting the stake (head) and wind sock (body) of a wind sock snow goose decoy of the present invention.
Figure 34:
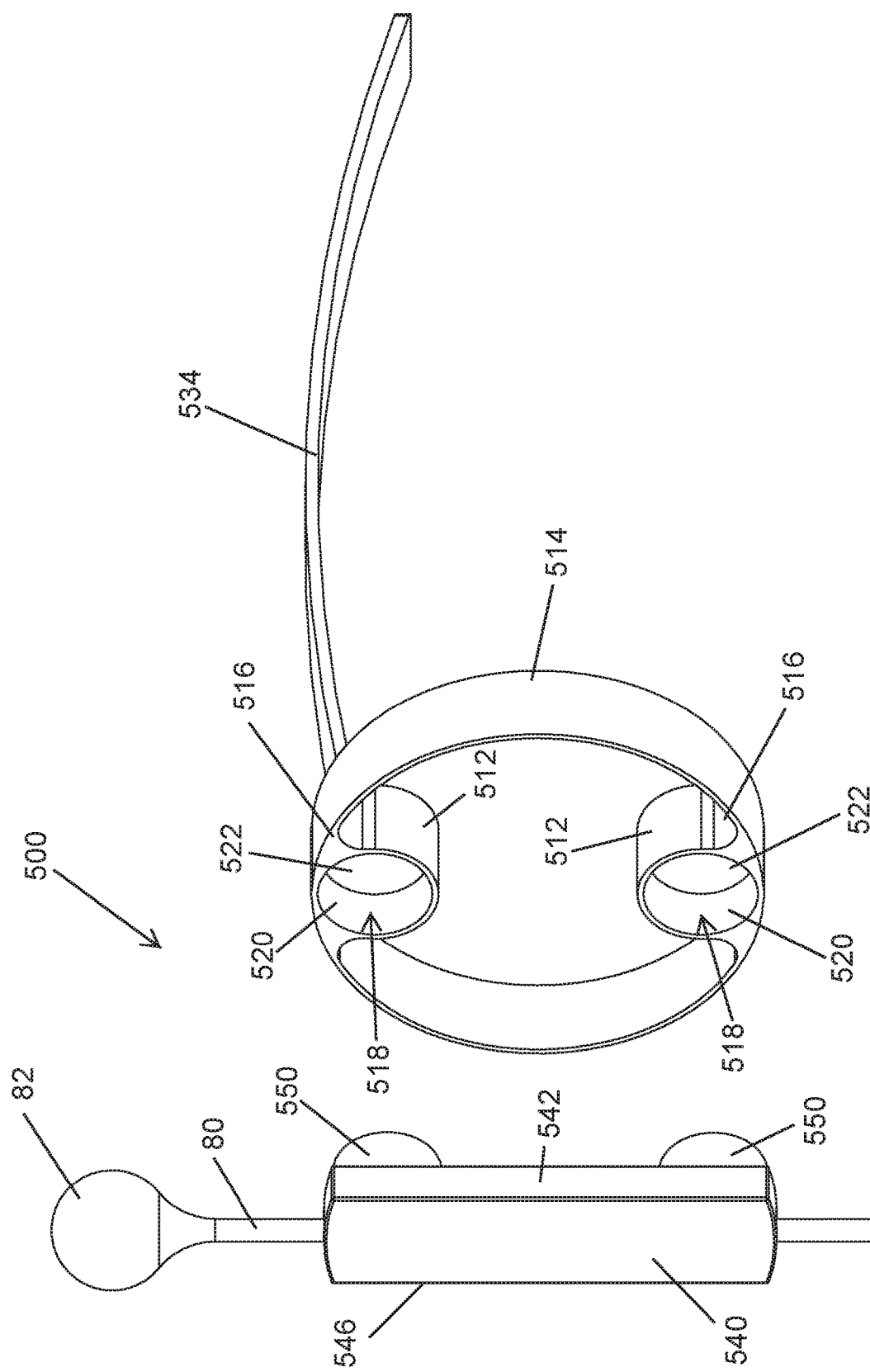
FIG. 34 is a front perspective view of an interlock in accordance with an embodiment of the invention.
Figure 35:
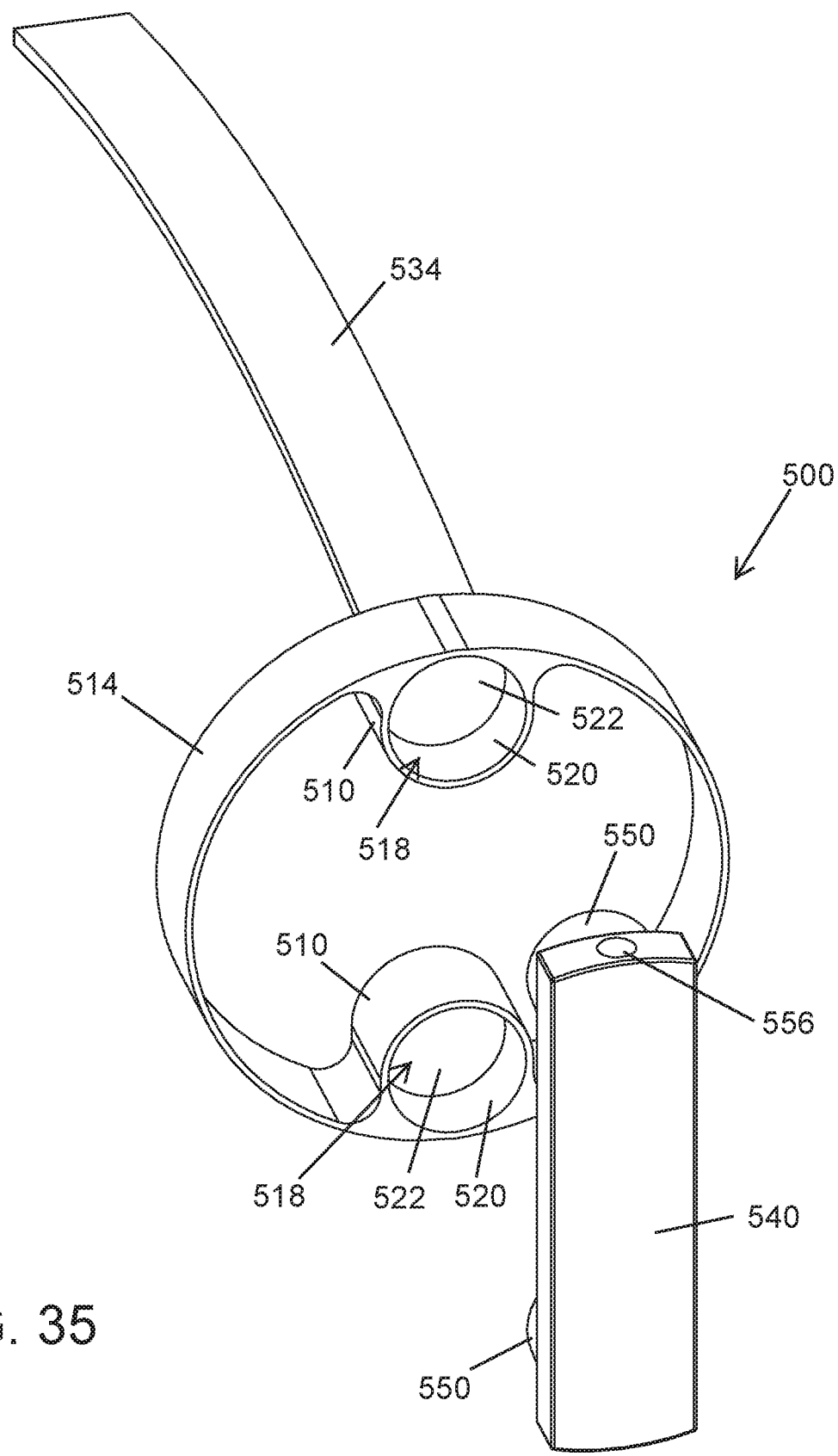
FIG. 35 is a front perspective view of an interlock in accordance with an embodiment of the invention.
Figure 36:
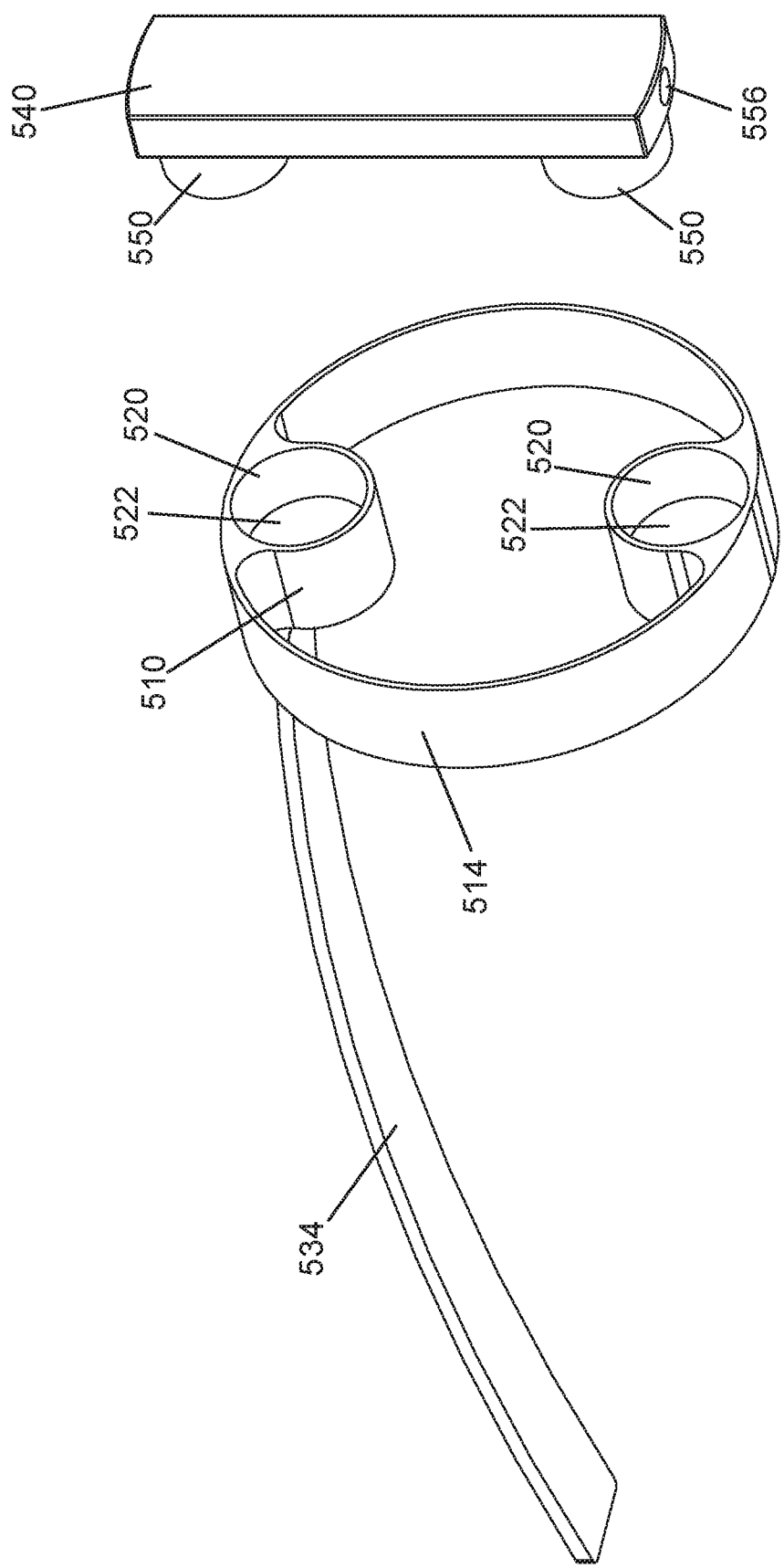
FIG. 36 is a front perspective view of an interlock in accordance with an embodiment of the invention.
Figure 37:
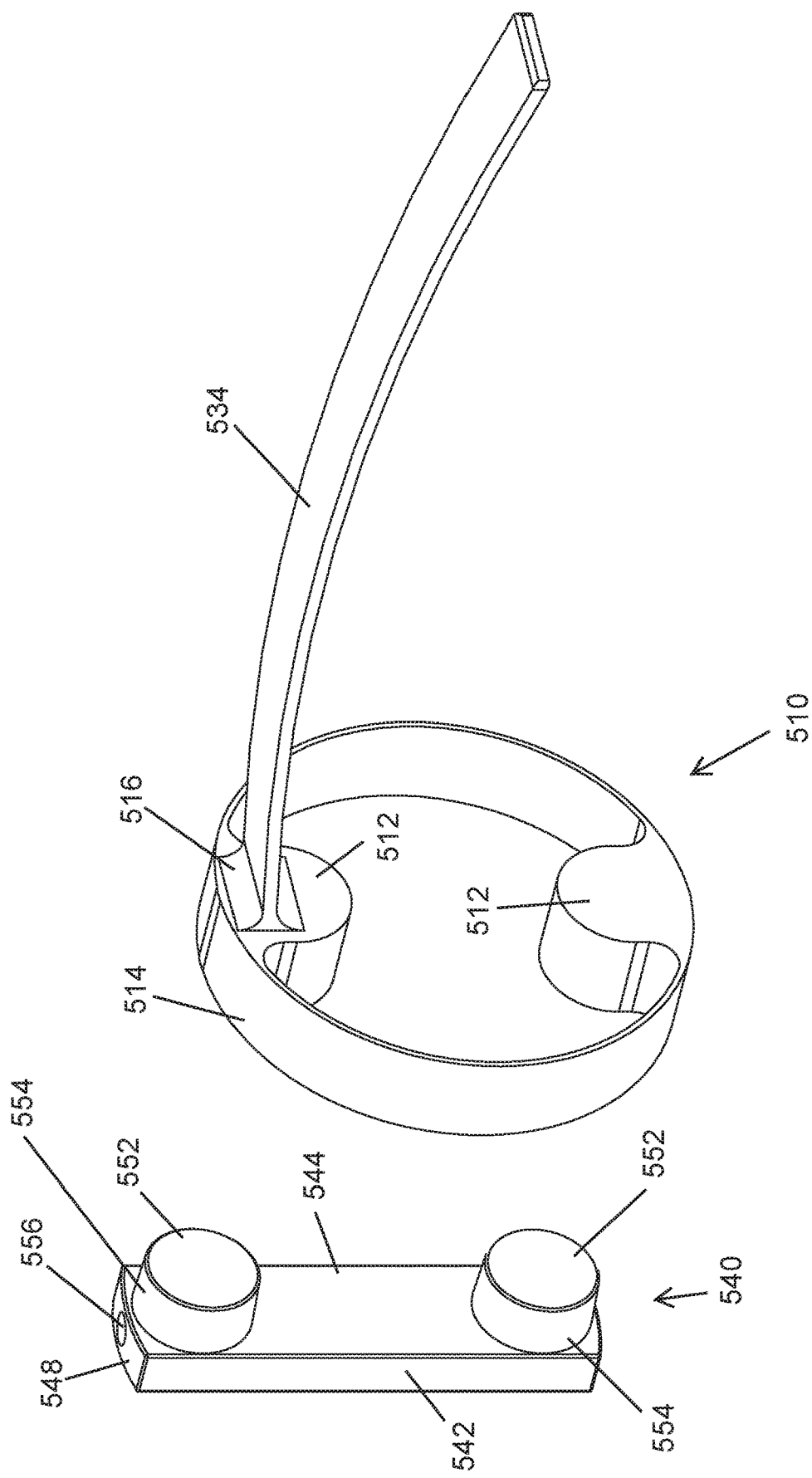
FIG. 37 is a back perspective view of an interlock in accordance with an embodiment of the invention.
Figure 38:
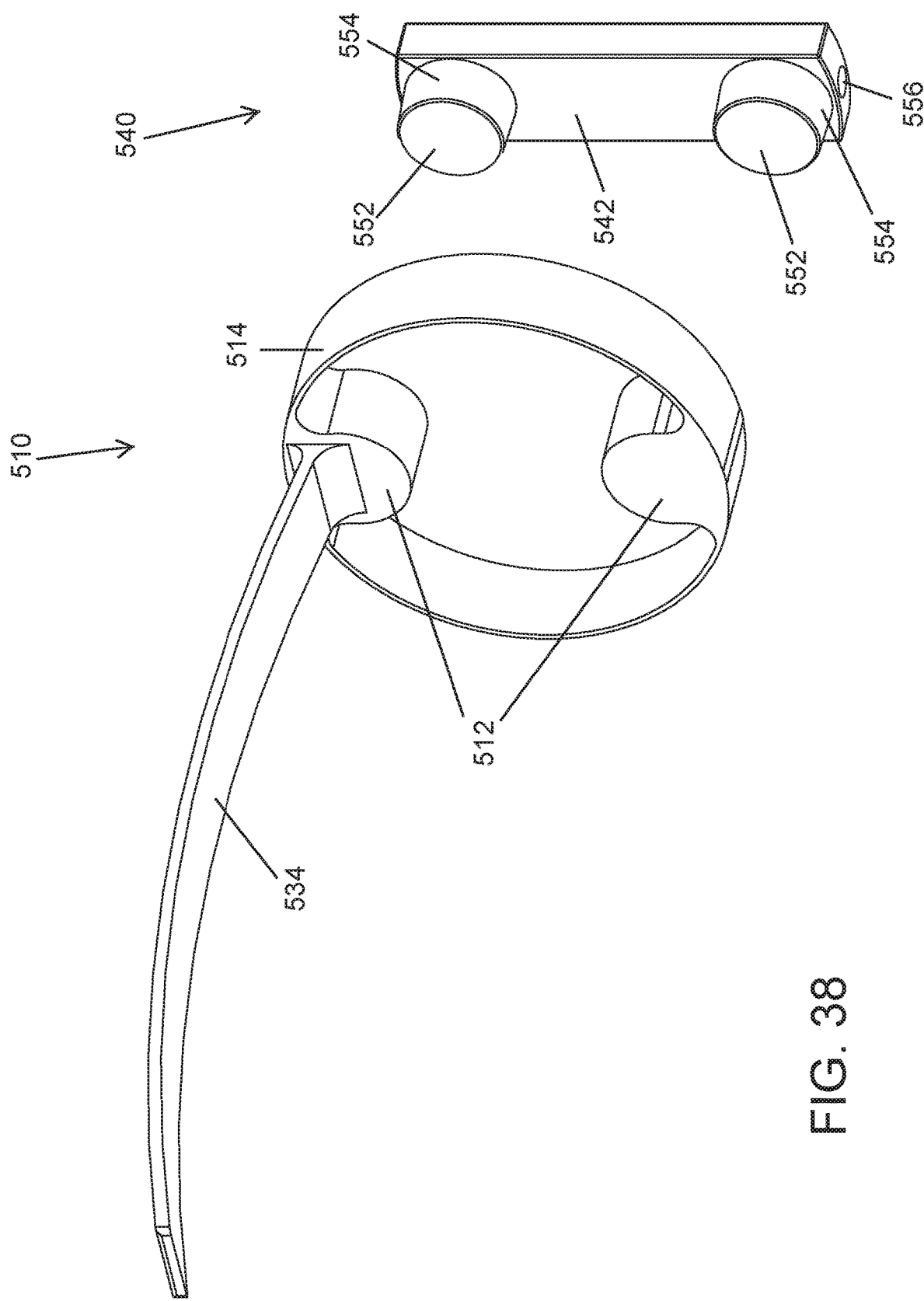
FIG. 38 is a back perspective view of an interlock in accordance with an embodiment of the invention.
Figure 39:
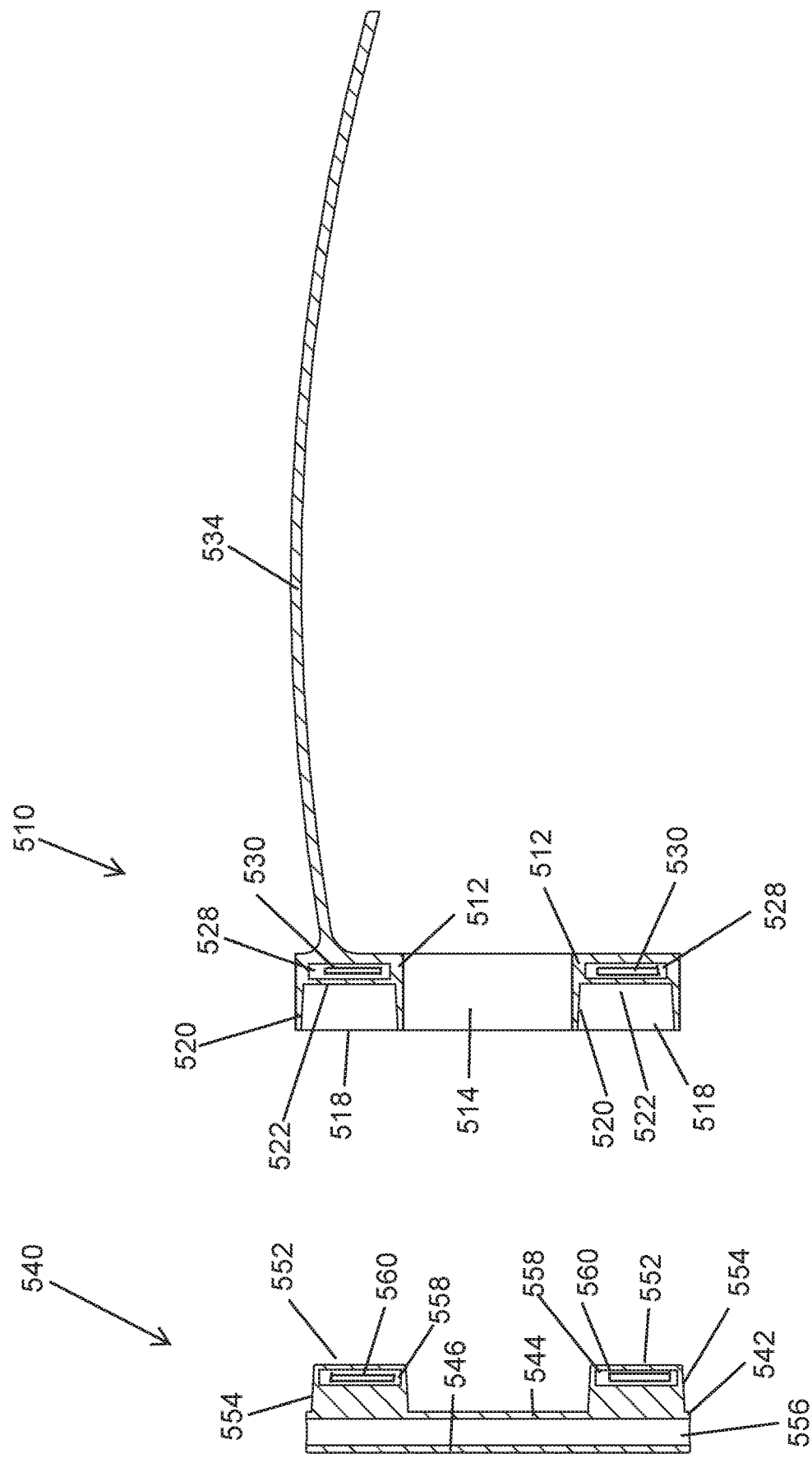
FIG. 39 is a partial sectional side perspective view of an interlock in accordance with an embodiment of the invention.

Referring to FIGS. 32 and 33 an interconnect 500 of the present invention is shown assembled with sock 70. The interconnect 500 includes two interlocks 510 spaced apart and coupled to ring 514 at interconnect 516. The grommets or holes 72 in the sock 70 may be enlarged such that the sock may be folded over ring 514 and base 512 of interlocks 510 extend through the enlarged hole 72. The interlock 500 of the present invention includes first interlock or connector 510 and mating second interlock or connector 540. The second connector 540 slidingly engages or otherwise couples to stake 80. Once the base 512 of the first connector 510 is inserted through enlarged holes of the sock 70 the connector 510 may remain coupled to the sock 70. Stakes 80 having connector 540 attached may be placed and inserted in the field in a variety of desired patterns. Magnets embedded in the connectors, together with the tapered sidewall of each connector, draw the first and second connector 510 and 540 together and hold the interlock 500 in place even during a heavy wind or breeze. An extension or backbone 534 extends from the interconnect 510 and provides support to an interior of the sock 70. The extension incudes a curvature that creates a further three dimensional appearance of the sock 70.

Referring to FIGS. 34-39 the interlock 500 of the present invention will be described in greater detail. The interlock 500 includes at least two first interconnects 510 each having a receptacle 518 spaced apart and coupled to ring 514 at interconnects 516. Each interconnect 510 has a base portion 512 into which the receptacle 518 is formed. The receptacle 518 includes an open end and tapered sidewall 520 that terminates at bottom 522. The bottom 522 has a cavity 528 formed within the bottom which is sized to receive a magnet 530. Similarly, the interlock 500 has at least two second interconnects 540 having protrusion 550 that align and mate with receptacle 518 of the first interconnect 510. Each second interconnect 540 has a base 542 having a front, back and ends 544, 546, and 548 respectively. Each protrusion 550 includes a tapered sidewall 554 that terminates at bottom 552. The bottom 552 has a cavity 558 formed within the bottom which is sized to receive a magnet 560. Although the receptacles 518 and protrusions 550 are illustrated as circular, those skilled in the art will appreciate that a non symmetric shape may be utilized to ensure a single upright orientation of the first and second interlocks 510 and 540. Further, although the cavities are shown enclosed and the magnets embedded, those skilled in the art will appreciate that the base 512 and bottom 552 may be split with caps separated from the base and bottom. After the magnets are inserted in respective cavities the caps may be sonic welded, glued or otherwise adhered to the base and protrusion, thereby enclosing or encapsulating the magnets within the cavities. The tapered sidewalls may have a draft angle of between 1-10 degrees, however, a 3 degree draft has been found to be well suited with the invention.

The base 542 of the second interlock includes a hole or aperture 556 through which stake 80 slidingly engages or extends. The multidimensional tapered surface together with the magnetic attraction between the magnets of the mating interconnects 510 and 540 provide a sufficient hold so that the sock does not disengage from the stake when the sock inflates in heavy winds. Advantageously, a pulling force that is directly outward so that the tapered sidewalls do not engage each other results in a quick and easy way to remove the sock from the stake. Of course, one of the magnets may be replaced with a material that is attracted to the opposing magnet, however using two magnets has been found desirable.

Although various embodiments of the present invention have been described, those skilled in the art will appreciate that the interconnect of the present invention allows for a stable and sturdy interconnect between a decoy body and extremity such as a head, legs, or stake. Further, the interconnect of the present invention is simple to execute while wearing heavy gloves or mittens and remain unaffected by freezing temperatures. The present interlock between the head and body of a decoy is capable of supporting the weight of the decoy body when lifting with the head and disengages without requiring unsnapping or twisting forces. Additionally, the interlock of the present invention is suitable for retrofitting to existing decoy heads and bodies.

Also, the present invention may be incorporated into a sock or silhouette style decoy having a stake that detaches from the sock without disassembling a portion of the stake and sock link. The stakes of the present invention may be quickly removed from the sock and stored in a separate storage compartment to keep the white socks clean during transport and storage.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A decoy for attracting animals, the decoy comprising:
a shape changeable decoy body portion comprising a flexible bag having an open end that allows air to continuously pass from outside the flexible bag through the open end to inflate the flexible bag and a removeable support portion coupled to the shape changeable decoy body portion proximate the open end of the flexible bag of the shape changeable decoy body portion;
a first connector having a receptacle, the receptacle having an open end, inward tapered side walls extending into the first connector from the open end, and terminating at a bottom portion within the first connector; the side walls having a first width adjacent the open end that is greater than a second width adjacent the bottom portion;
a second connector having a base portion that interconnects with the first connector, the base portion including an outwardly extending tapered projection terminating in an end; the tapered projection is sized to fit within the receptacle of the first connector;
wherein at least one of the bottom portion of the receptacle and the end of the projection includes a magnet contained thereby and wherein an other one of the bottom portion of the receptacle and the end of the projection includes a member contained thereby that attracts to the magnet; and
further wherein one of the first and second connector is coupled to the shape changeable decoy body portion and an other one of the first and second connector is coupled to the removeable support portion of the decoy; and
wherein the one of the first and second connectors engage the open end of the flexible bag of the shape changeable decoy body portion without significantly blocking the passage of external air through the open end of the flexible bag.

2. The decoy as recited in claim 1, wherein the removeable support portion includes a pole slidingly engaged to the removeable support portion.

3. The decoy as recited in claim 1, further including a support member extending from the one of the first and second connectors and extending into an interior of the shape changeable decoy body portion.

4. The decoy as recited in claim 1, further including a ring portion surrounding at least a portion of the one of the first and second connectors and positioned proximate the open end of the flexible bag of the shape changeable decoy body portion to maintain the open end.

5. The decoy as recited in claim 1, wherein the magnet has a shape of a rectangle.

6. The decoy as recited in claim 1, wherein the magnet has the shape of a disc.

7. The decoy as recited in claim 1, wherein the member that attracts to the magnet is magnetized.

8. A decoy for attracting, the decoy comprising:
a shape changeable decoy body portion and a removeable support portion, wherein the shape changeable decoy body portion is comprised of a flexible bag having an open end that allows air to continuously pass from outside the flexible bag through the open end to inflate the flexible bag and wherein the removeable support portion is coupled to the shape changeable decoy body portion proximate the open end of the flexible bag of the shape changeable decoy body portion;
a first connector having a receptacle, the receptacle having an open end, inward tapered side walls extending into the first connector from the open end, and terminating at a bottom portion within the first connector; the side walls having a first width adjacent the open end that is greater than a second width adjacent the bottom portion, wherein the first connector includes an annular ring surrounding at least a portion of the first connector and wherein at least a portion of the annular ring engages the open end of the flexible bag to maintain the open end;

a second connector having a base portion that interconnects with the first connector, the base portion including an outwardly extending tapered projection terminating in an end; the tapered projection is sized to fit within the receptacle of the first connector;

wherein the bottom portion of the receptacle includes a magnet contained thereby and the end of the projection includes a magnet contained thereby; and further wherein the first connector is coupled to the shape changeable decoy body portion proximate the open end of the flexible bag of the shape changeable decoy body portion and the second connector is coupled to the removeable support portion of the decoy coupled to the shape changeable decoy body portion proximate the open end of the flexible bag of the shape changeable decoy body portion.

9. The decoy as recited in claim 8, wherein the removeable support portion includes a pole slidingly engaged to the removeable support portion.

10. The decoy as recited in claim 8, further including a support member extending from the first connector and extending into an interior of the flexible bag of the shape changeable decoy body portion.

11. A decoy for attracting animals, the decoy comprising:
a body portion;
a removeable portion;
an interlock that interconnects the body portion and removeable portion, wherein the interlock comprises:
a first connector having a receptacle, the receptacle having an open end, inward tapered side walls extending into the first connector from the open end, wherein the tapered side wall of the receptacle has a draft angle ranging between 1 to 10 degrees, and the tapered side wall terminating at a bottom portion within the first connector; the side walls having a first width adjacent the open end that is greater than a second width adjacent the bottom portion;
a second connector having a base portion that interconnects with the first connector, the base portion including an outwardly extending tapered projection terminating in an end, wherein the cylindrical tapered projection has a draft angle ranging between 1 to 10 degrees; the cylindrical tapered projection is sized to fit within the cylindrical tapered side wall of the receptacle of the first connector; and wherein at least one of the bottom portion of the receptacle and the end of the projection includes a magnet having an estimated pull force ranging between 15-30 lbs contained thereby and wherein an other one of the bottom portion of the receptacle and the end of the projection includes a member contained thereby that attracts to the magnet; and further wherein one of the first and second connector forms a portion of the body portion of the decoy and an other one of the first and second connector forms a portion of the removeable portion of the decoy; and further wherein the interlock draws the body and removeable portion together with a sufficient force to allow a user to carry the decoy by the removeable portion without having the removeable portion fall off the body.

12. The decoy as recited in claim 11, wherein the first connector includes a rim extending outwardly from the receptacle and the second connector includes a rim extending outwardly from the base portion.

13. The decoy as recited in claim 12, wherein the rim of the first connector is profiled to match the contour of at least one of the body portion and removeable portion of the decoy.

14. The decoy as recited in claim 12, wherein the rim of the second connector is profiled to match the contour of at least one of the body portion and removeable portion of the decoy.

15. The decoy as recited in claim 11, wherein the body portion is comprised of a flexible bag having an open end that allows air to pass from outside the flexible bag through the open end to inflate the flexible bag, wherein one of the first and second connectors engage the open end of the bag without significantly blocking the passage of external air through the open end of the flexible bag.

16. The decoy as recited in claim 15, wherein the other one of the first and second connector includes a pole slidingly engaged to the other one of the first and second connector.

17. The decoy as recited in claim 15, further including a support member extending from the one of the first and second connectors and extending into an interior of the bag.

18. The decoy as recited in claim 15, further including an annular ring surrounding at least a portion of the one of the first and second connectors.

19. The decoy as recited in claim 15, further including a semi-circular ring surrounding a portion of the one of the first and second connectors.

* * * * *